United States Patent
Ishikawa et al.

(10) Patent No.: US 11,947,715 B2
(45) Date of Patent: Apr. 2, 2024

(54) CONTROL DEVICE, CONTROL METHOD, AND CONTROL SYSTEM

(71) Applicant: SONY GROUP CORPORATION, Tokyo (JP)

(72) Inventors: Tsuyoshi Ishikawa, Tokyo (JP); Takeshi Ogita, Tokyo (JP); Yohei Fukuma, Tokyo (JP); Taha Moriyama, Tokyo (JP); Ikuo Yamano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/998,677

(22) PCT Filed: May 14, 2021

(86) PCT No.: PCT/JP2021/018516
§ 371 (c)(1),
(2) Date: Nov. 14, 2022

(87) PCT Pub. No.: WO2021/235370
PCT Pub. Date: Nov. 25, 2021

(65) Prior Publication Data
US 2023/0168733 A1 Jun. 1, 2023

(30) Foreign Application Priority Data
May 21, 2020 (JP) .................................. 2020-089152

(51) Int. Cl.
*B65H 75/44* (2006.01)
*G06F 3/01* (2006.01)
*G06F 3/0346* (2013.01)
*B65H 75/48* (2006.01)

(52) U.S. Cl.
CPC .......... *G06F 3/011* (2013.01); *B65H 75/4418* (2013.01); *G06F 3/0346* (2013.01); *B65H 75/4486* (2013.01); *B65H 75/486* (2013.01)

(58) Field of Classification Search
CPC .... B65H 75/4418; G06F 3/011; G06F 3/0346
See application file for complete search history.

(56) References Cited

FOREIGN PATENT DOCUMENTS

| EP | 3599540 A1 * | 1/2020 | ............ A63F 13/24 |
|---|---|---|---|
| JP | 06-324622 A | 11/1994 | |
| JP | 2018-152007 A | 9/2018 | |
| JP | 2019-133233 A | 8/2019 | |

OTHER PUBLICATIONS

International Search Report and Written Opinion of PCT Application No. PCT/JP2021/018516, dated Jun. 22, 2021, 08 pages of ISRWO.

* cited by examiner

*Primary Examiner* — Sardis F Azongha
(74) *Attorney, Agent, or Firm* — CHIP LAW GROUP

(57) ABSTRACT

A control device according to an embodiment includes: a winding unit (30, 3001) that unwinds a wire having one end movably held by a user in a direction of the one end and winds the wire by an elastic force in a direction away from the one end, a wire lock unit (30, 3002) that locks unwinding of the wire from the winding unit, and a control unit (100) that controls an operation by the wire lock unit of locking the unwinding according to a relationship between a position of a virtual object disposed in a virtual space and a position, in the virtual space, corresponding to a position of the one end in a real space.

20 Claims, 18 Drawing Sheets

CONTROL DEVICE, CONTROL METHOD, AND CONTROL SYSTEM

CROSS REFERENCE TO RELATED APPLICATIONS

This application is a U.S. National Phase of International Patent Application No. PCT/JP2021/018516 filed on May 14, 2021, which claims priority benefit of Japanese Patent Application No. JP 2020-089152 filed in the Japan Patent Office on May 21, 2020. Each of the above-referenced applications is hereby incorporated herein by reference in its entirety.

FIELD

The present disclosure relates to a control device, a control method, and a control system.

BACKGROUND

Virtual reality (VR) and augmented reality (AR) have become widespread as technologies for realizing realistic experience. Virtual reality is a technology for providing a virtual world with a sense of reality for a user. Furthermore, augmented reality is a technology for expanding a real environment to which users are close, and is generally realized by superimposing a virtual space on a real space.

In the content of VR or AR, haptic presentation when the user stretches out a hand and comes in contact with a virtual object that is a virtual object is an element necessary for reality reproduction of the virtual object. For example, Patent Literature 1 discloses a technique in which a length of a plurality of wires is adjusted by a motor to fix, for example, a hand of a user at a specific position, thereby performing control so that the hand does not get stuck in a virtual object when colliding with the virtual object.

CITATION LIST

Patent Literature

Patent Literature 1: JP 2019-133233 A

SUMMARY

Technical Problem

When the wire length is adjusted by the motor, it is necessary to rotate the motor so as to extend the wire in a case where the hand moves in a direction away from the motor (in a case where the hand is pulled), and it is necessary to rotate the motor so as to wind the wire in a case where the hand moves in a direction approaching the motor (in a case where the hand is shrunk). However, in the configuration using the motor, the extension and contraction and the locking of the wire do not follow the quick movement of the user, and a situation in which a hand is stuck in the virtual object may occur.

An object of the present disclosure is to provide a control device, a control method, and a control system that enable more advanced reality expression in virtual reality.

Solution to Problem

For solving the problem described above, a control device according to one aspect of the present disclosure has a winding unit that unwinds a wire having one end movably held by a user in a direction of the one end and winds the wire by an elastic force in a direction away from the one end; a wire lock unit that locks unwinding of the wire from the winding unit; and a control unit that controls an operation by the wire lock unit of locking the unwinding according to a relationship between a position of a virtual object disposed in a virtual space and a position, in the virtual space, corresponding to a position of the one end in a real space.

DESCRIPTION OF EMBODIMENTS

Figure 1:
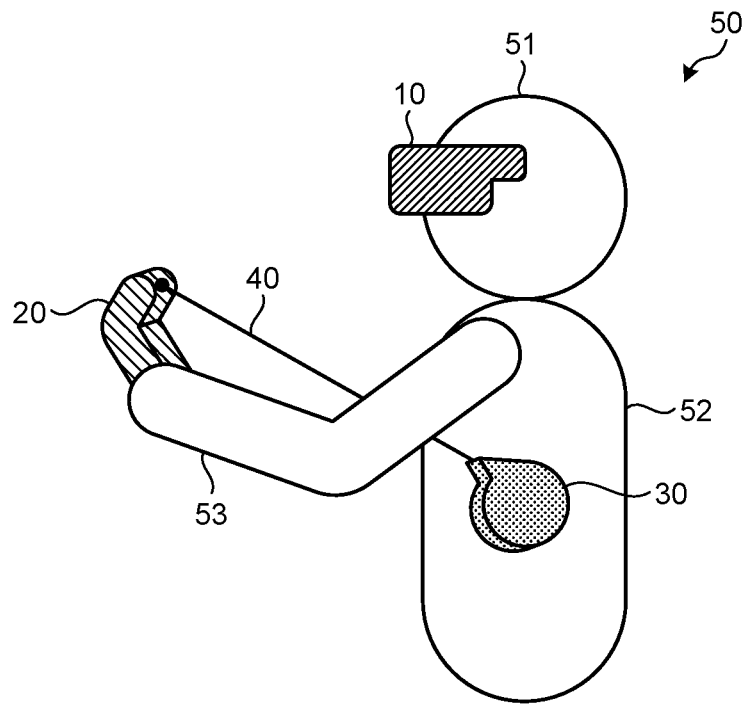
FIG. 1 is a schematic diagram schematically illustrating a control system according to the present disclosure.

Hereinafter, the embodiments of the present disclosure will be described in detail with reference to the drawings. In the following embodiments, the same parts are designated by the same reference numerals, so that duplicate description will be omitted.

Hereinafter, embodiments of the present disclosure will be described in the following order.

1. Summary of the present disclosure
2. First embodiment
2-1. Configuration of control system according to first embodiment
2-2. Hardware configuration of an example of HMD applicable to first embodiment
2-3. Hardware configuration of an example of controller applicable to first embodiment
2-4. Configuration of wire control device according to first embodiment
2-5. Comparison with existing technology
2-6. Modification of first embodiment
3. Second embodiment
3-1. Outline of second embodiment
3-2. First example of second embodiment
3-3. Second example of second embodiment
3-4. Third example of second embodiment
3-5. Fourth example of second embodiment
4. Third embodiment
5. Fourth embodiment

1. Overview of Present Disclosure

First, the technology according to the present disclosure will be schematically described. The present disclosure relates to virtual reality (VR) and augmented reality (AR), and relates to a technology for improving reality of a sense-of-force received by a user in a case where the user comes in contact with an object (virtual object) disposed in a virtual space in the virtual space.

The technology of the present disclosure is similarly applicable to both virtual reality and augmented reality. In the following description, it is assumed that the technology of the present disclosure is applied to virtual reality.

FIG. 1 is a schematic diagram schematically illustrating a control system according to the present disclosure. In the example of FIG. 1, a user 50 wears a head mounted display 10 (hereinafter, the HMD 10) on a head 51, and holds a controller 20 with an arm 53 (hand). A wire 40 has one end connected to the controller 20, and is wound from the other end by a winding unit included in a wire control device 30 attached to a body 52 of the user 50.

The HMD 10 is provided with a display unit so as not to transmit the real space in correspondence with the left and right eyes of the user 50. Furthermore, the HMD 10 is provided with a sound output device (earphone, headphone, etc.) for outputting sound to the left and right ears of the user 50. The HMD 10 can reproduce the content stored by the HMD 10 itself or acquired from the outside by communication using the display unit and the sound output device. In a case where the content supports virtual reality, the user 50 can observe, for example, the image of the virtual space displayed on the display unit as if the image is an image of a real space.

Figure 2:
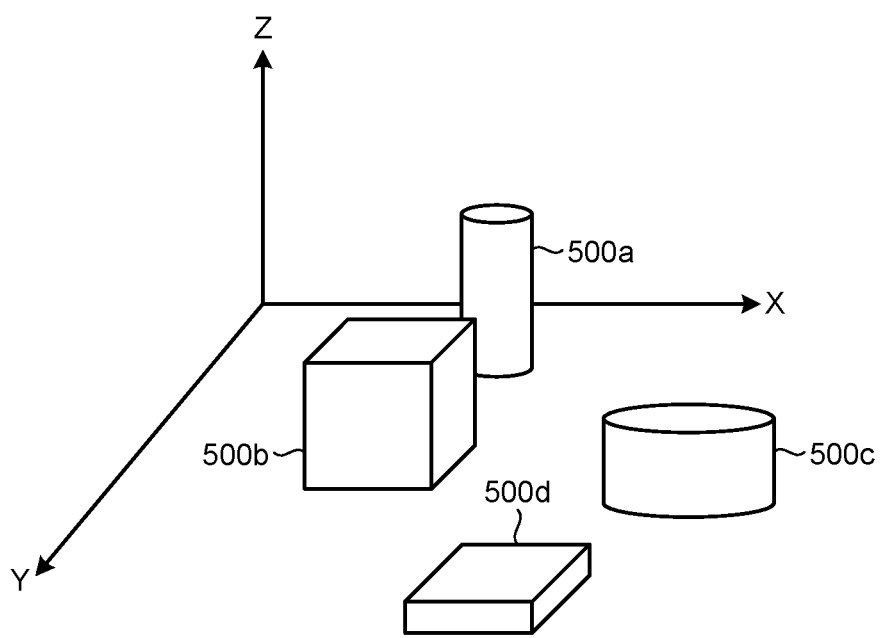
FIG. 2 is a schematic diagram schematically illustrating an example of a virtual space.

FIG. 2 is a schematic diagram schematically illustrating an example of a virtual space. In FIG. 2, virtual objects 500a, 500b, 500c, and 500d each having three-dimensional coordinate information are disposed in a virtual space that is a three-dimensional space expressed by an X axis, a Y axis, and a Z axis orthogonal to each other. The user 50 can confirm the position including the depth direction of each of the virtual objects 500a to 500d in the virtual space and the space occupied in the virtual space by observing the virtual space with the HMD 10.

The controller 20 is provided with an operator for the user 50 to perform an operation to output a control signal for controlling the HMD 10 according to a user operation or the like. The control signal output from the controller 20 is transmitted to the HMD 10.

In addition, the controller 20 has a position tracking function of tracking a position. The controller 20 transmits tracking information indicating a change amount of the position acquired by the position tracking function to the HMD 10. The HMD 10 can find the position of the arm 53 (hand) in the virtual space based on the tracking information transmitted from the controller 20. As a result, the HMD 10 can find virtual contact of the arm 53 (hand) of the user 50 with an object (virtual object) disposed in the virtual space, for example.

In the wire control device 30, the winding unit has a function of unwinding the wire 40 and a function of automatically winding the unwound wire 40. When the controller 20 is pushed forward, for example, by the user, the winding unit unwinds the wire 40 according to the pushed distance. In addition, when the controller 20 is pulled back to the user by the user, the winding unit automatically winds the wire 40 according to the pulled back distance. Although details will be described later, the winding of the wire 40 in the winding unit is performed using the elastic force of the elastic body, and does not use power by electrical control such as a motor.

Furthermore, the wire control device 30 has a wire lock function of locking the unwinding of the wire 40 based on the relationship between the content reproduced by the HMD 10 and the position of the controller 20 detected by the position tracking function of the controller 20.

Figure 3A:
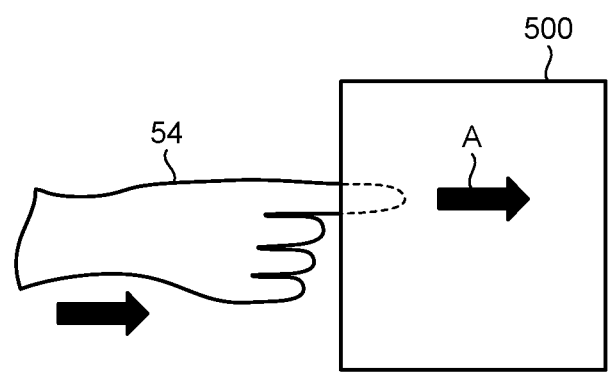
FIGS. 3A and 3B are schematic diagrams illustrating an operation example related to a wire lock function according to each embodiment.
Figure 3B:
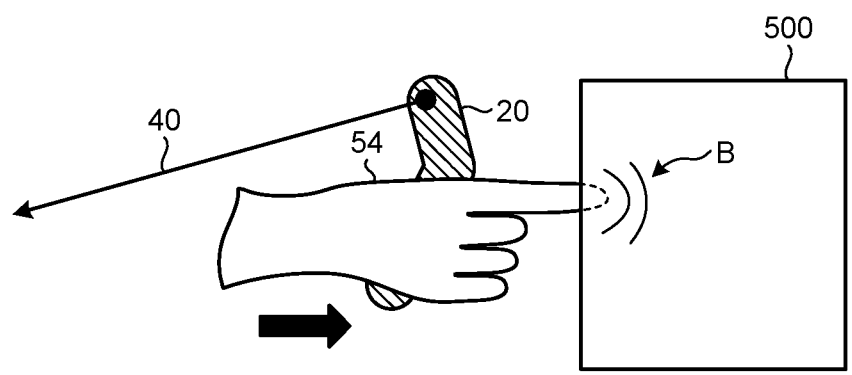

FIGS. 3A and 3B are schematic diagrams illustrating an operation example related to the wire lock function according to each embodiment. As an example, consider a case where the user 50 extends the arm 53 and performs an operation of a hand 54 of the user 50 virtually getting stuck in a virtual object 500 disposed in the virtual space reproduced (displayed) by the HMD 10.

In a case where the wire lock function is not used, as the schematically illustrated FIG. 3A, even after, for example, the fingertip of the hand 54 comes into contact with the surface of the virtual object 500 and the contact is detected by the HMD 10, the user 50 can continue to extend the arm 53. As a result, the fingertip of the hand 54 enters the inside of the virtual object 500 as indicated by an arrow A in the figure. This means that reality that the user 50 feels is impaired.

FIG. 3B schematically illustrates an example in which the wire lock function according to the present disclosure is used. In this case, when the hand 54 (fingertip) of the user 50 comes into contact with the surface of the virtual object 500 and the HMD 10 detects the contact, the HMD 10 instructs the wire control device 30 to lock the wire 40. In accordance with this instruction from the HMD 10, the wire control device 30 operates a wire lock mechanism described later to lock the unwinding of the wire 40. As a result, as schematically indicated by the symbol B in the figure, the motion of extending the arm 53 is inhibited, and the user 50 can feel as if a reaction force is received from the virtual object 500. Therefore, the user 50 can obtain a feeling as if he/she has come in contact with an object (real object) disposed in the real space, and more advanced expression of reality is possible.

2. First Embodiment

Next, the first embodiment of the present disclosure will be described.

Figure 4:
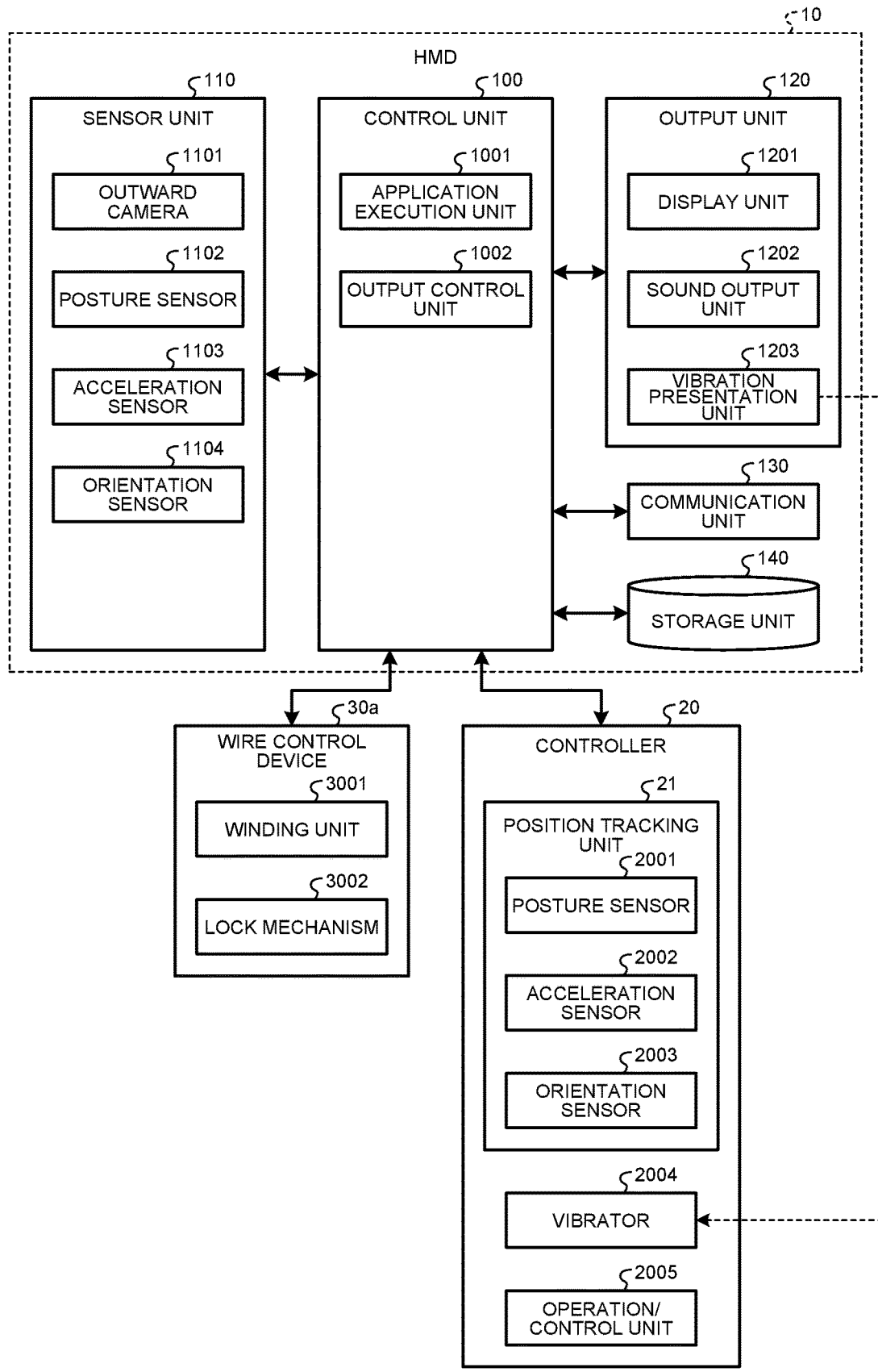
FIG. 4 is a functional block diagram of an example for explaining functions of an HMD, a controller, and a wire control device applicable to the first embodiment.

(2-1. Configuration of control system according to first embodiment) First, a configuration of a control system according to the first embodiment will be described. FIG. 4 is a functional block diagram of an example for explaining the functions of the HMD 10, the controller 20, and the wire control device 30 applicable to the first embodiment. In FIGS. 3A and 3B, the HMD 10 includes a control unit 100, a sensor unit 110, and an output unit 120. The control unit 100 controls the entire operation of the HMD 10.

The sensor unit 110 includes an outward camera 1101, a posture sensor 1102, an acceleration sensor 1103, and an orientation sensor 1104.

As the outward camera 1101, for example, an RGB camera capable of outputting a so-called full-color captured image of each color of red (R), green (G), and blue (B) can be employed. The outward camera 1101 is disposed on the HMD 10 so as to capture an image in the line-of-sight direction of the user wearing the HMD 10. The outward camera 1101 is for imaging the outside from the HMD 10, and can image, for example, the hand 54 of the user. The image signal of the captured image captured by the outward camera 1101 is transferred to the control unit 100.

The posture sensor 1102 is, for example, a 3-axis or a 9-axis gyro sensor, and detects the posture of the HMD 10, for example, roll, pitch, and yaw. The acceleration sensor 1103 detects acceleration applied to the HMD 10. The orientation sensor 1104 is, for example, a geomagnetic sensor and detects an orientation in which the HMD 10 faces. For example, the current position with respect to the initial position of the HMD 10 can be obtained based on the detection result of the acceleration sensor 1103 and the detection result of the orientation sensor 1104. The posture sensor 1102, the acceleration sensor 1103, and the orientation sensor 1104 may be configured by an inertial measurement unit (IMU).

The sensor signal output from each of the posture sensor 1102, the acceleration sensor 1103, and the orientation sensor 1104 is transferred to the control unit 100. The control unit 100 can detect the position and posture of the head of the user wearing the HMD 10 based on these sensor signals.

The output unit includes a display unit 1201, a sound output unit 1202, and a vibration presentation unit 1203. Note that the display unit 1201 actually includes two display devices corresponding to the left and right eyes.

The display unit 1201 includes a non-transmissive display installed in front of both eyes of the user wearing the HMD 10, and performs display according to the display control signal generated by the control unit 100. The control unit 100 causes the display unit 1201 to display, for example, the left-eye image and the right-eye image in consideration of the parallax between the left and right eyes on two display devices corresponding to the left and right eyes, respectively so that the user 50 can observe a stereoscopic image.

The sound output unit 1202 includes a single sounding element or an array of a plurality of sounding elements that converts a sound signal supplied from the control unit 100 into a sound as aerial vibration to output the sound, and constitutes a speaker or an earphone. In the HMD 10, for example, the sound output units 1202 each are disposed corresponding to the left and right ears of the user. The control unit 100 can cause the sound output unit 1202 to output a sound related to the virtual object displayed on the display unit 1201. The present invention is not limited to this, and the control unit 100 can also cause the sound output unit 1202 to output sounds by other types of sound signals.

Under the control of the control unit 100, the vibration presentation unit 1203 generates, for controller 20, a control signal for giving a stimulus (for example, vibration) to the finger of the user holding controller 20.

A communication unit 130 communicates with the controller 20 via wireless communication or wired communication. The communication unit 130 communicates with the controller 20 using, for example, wireless communication by Bluetooth (registered trademark). A communication method by which the communication unit 130 communicates with the controller 20 is not limited to Bluetooth (registered trademark). Furthermore, the communication unit 130 can execute communication via a network such as the Internet.

A storage unit 140 can store data generated by the control unit 100 and data used by the control unit 100 in a non-volatile manner.

The control unit 100 includes an application execution unit 1001 (described as an application execution unit 1001 in the figure) and an output control unit 1002. The application execution unit 1001 and the output control unit 1002 are implemented by a central processing unit (CPU) included in the HMD 10 to be described later reading and executing a haptic presentation program stored in the storage unit 140, for example. Not limited to this, part or all of the application execution unit 1001 and the output control unit 1002 may be configured by a hardware circuit that operates in cooperation with each other.

The application execution unit 1001 executes an application program including a virtual reality (VR) application under an execution environment provided by an operating system (OS). The application execution unit 1001 may simultaneously execute a plurality of application programs in parallel. The VR application is, for example, an application such as a viewer of the content representing a virtual space. The VR application generates three-dimensional information for displaying the virtual space in which the virtual objects 500a to 500d are disposed as schematically illustrated in FIG. 2. Furthermore, the VR application can also generate three-dimensional information imitating the body part of the user 50 viewed from the viewpoint of the user 50 based on the output by the outward camera 1101 or a position tracking unit 21 to be described later.

Furthermore, the application execution unit 1001 can detect the position of the controller 20 by an inside-out method, for example, based on the captured image output from the outward camera 1101.

The application execution unit 1001 further generates a display control signal for controlling display on the display unit 1201, and also controls a display operation in the display unit 1201 of the virtual space by the VR application according to the generated display control signal.

The output control unit 1002 controls outputs by the display unit 1201, the sound output unit 1202, and the vibration presentation unit 1203 based on an execution result of an application program such as a VR application.

In FIG. 4, the controller 20 includes a position tracking unit 21, a vibrator 2004, and an operation/control unit 2005. Furthermore, the position tracking unit 21 includes a posture sensor 2001, an acceleration sensor 2002, and an orientation sensor 2003.

Among these sensors, the posture sensor 2001, the acceleration sensor 2002, and the orientation sensor 2003 have functions corresponding to the posture sensor 1102, the acceleration sensor 1103, and the orientation sensor 1104 described above, respectively, and detect the posture, the acceleration, and the orientation of the controller 20. For example, the position tracking unit 21 can estimate the current position of the controller 20 by accumulating changes in the posture, the acceleration, and the orientation for each unit time.

As in the case of the sensor unit 110, the posture sensor 2001, the acceleration sensor 2002, and the orientation sensor 2003 may be configured by an inertial measurement unit (IMU).

The vibrator 2004 is supplied with the control signal generated by the above-described vibration presentation unit 1203, and performs an operation of giving a stimulus (vibration in this example) to the hand 54 of the user 50 holding the controller 20 according to the control signal.

In FIG. 4, a wire control device 30*a* includes a winding unit 3001 and a lock mechanism 3002. The winding unit 3001 unwinds and winds the wire 40, and can use the elastic force of the elastic body to keep the tension of the unwound wire 40 constant and automatically wind the wire 40. The lock mechanism 3002 locks unwinding of the wire 40 in accordance with an instruction from the control unit 100. Details of the winding unit 3001 and the lock mechanism 3002 will be described later.

Figure 5:
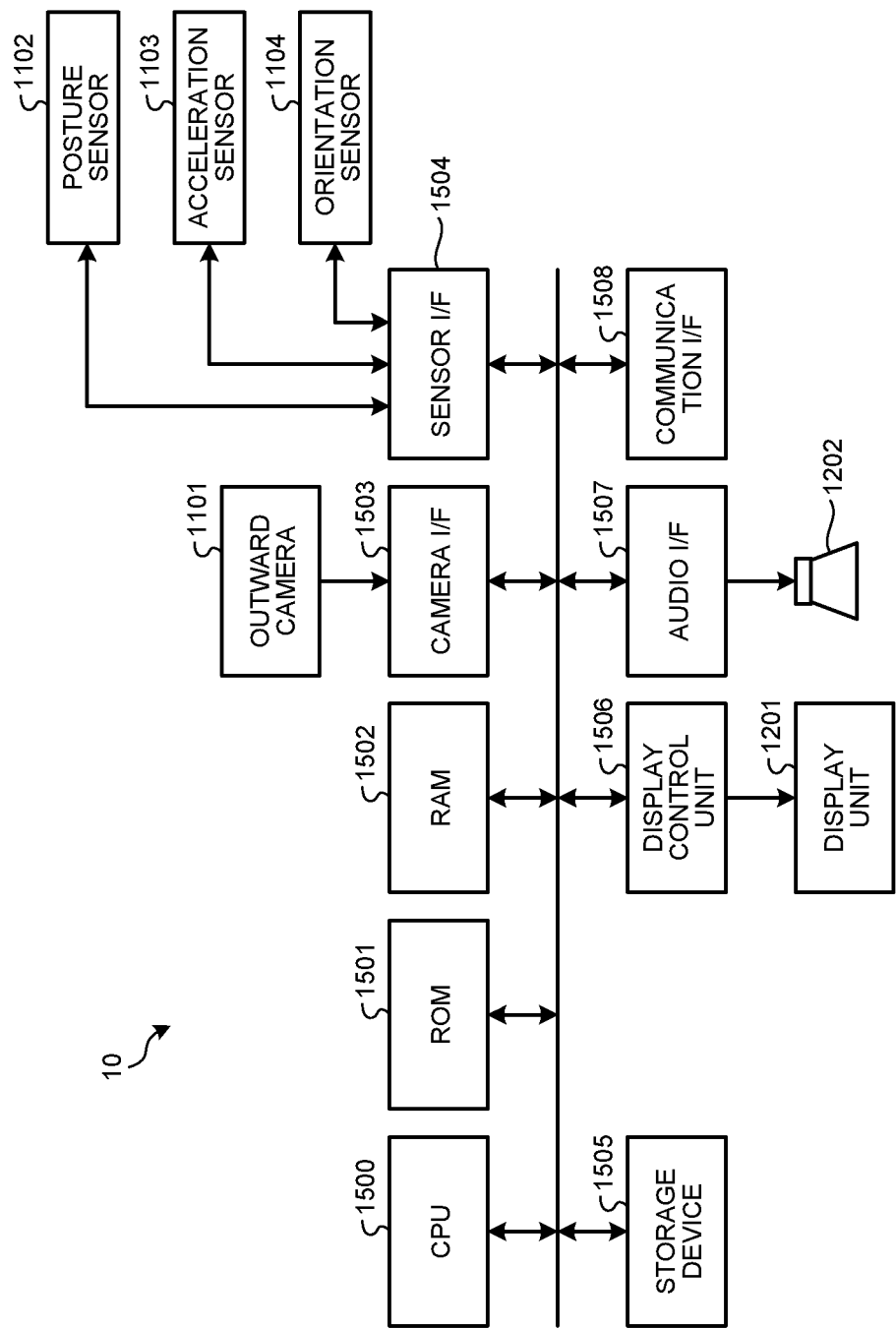
FIG. 5 is a block diagram illustrating a hardware configuration of an example of an HMD applicable to the first embodiment.

2-2. Hardware Configuration of an Example of HMD Applicable to the First Embodiment FIG. 5 is a block diagram illustrating a hardware configuration of an example of the HMD 10 applicable to the first embodiment. In FIG. 5, the HMD 10 includes a CPU 1500, a read only memory (ROM) 1501, a random access memory (RAM) 1502, a camera interface (I/F) 1503, a sensor I/F 1504, a storage device 1505, a display control unit 1506, an audio I/F 1507, and a communication I/F 1508, which are communicably connected to each other via a bus. As described above, the HMD 10 has a configuration as a computer (information processing device) including a CPU, a memory, and various I/Fs.

The storage device 1505 is a nonvolatile storage medium such as a flash memory, and implements the function of the storage unit 140 described with reference to FIG. 4. The CPU 1500 operates using the RAM 1502 as a work memory according to an information processing program stored in advance in the storage device 1505 or the ROM 1501, and controls the entire operation of the HMD 10.

The camera I/F 1503 is an interface for the outward camera 1101, and supplies an image signal output from the outward camera 1101 to the bus. Furthermore, a control signal, for controlling the outward camera 1101, which is generated by the CPU 1500 according to the information processing program, is transmitted to the outward camera 1101 via the camera I/F 1503.

The sensor I/F 1504 is an interface for the posture sensor 1102, the acceleration sensor 1103, and the orientation sensor 1104, and sensor signals output from the posture sensor 1102, the acceleration sensor 1103, and the orientation sensor 1104 are supplied to the bus via the sensor I/F 1504.

The display control unit 1506 controls a display operation by the display unit 1201 in accordance with a command from the CPU 1500. For example, the display control unit 1506 converts a display control signal generated by the CPU 1500 according to the information processing program into a display signal displayable by the display unit 1201, and supplies the display signal to the display unit 1201.

The audio I/F 1507 is an interface for the sound output unit 1202. For example, the audio I/F 1507 converts a signal into a signal in a format that can be reproduced by the sound output unit 1202 based on a digital sound signal generated by the CPU 1500 in accordance with the VR application and supplied via the bus, and supplies the signal to the sound output unit 1202.

The communication I/F 1508 controls communication between the HMD 10 and the controller 20 in accordance with a command from the CPU 1500. Furthermore, the communication I/F 1508 can also control communication with the outside. For example, the communication I/F 1508 controls communication with a server or the like via a network such as the Internet.

For example, when the haptic presentation program according to each embodiment is executed, the CPU 1500 configures the application execution unit 1001 and the output control unit 1002 included in the above-described control unit 100 on a main storage area of the RAM 1502 as modules, for example. Note that the haptic presentation program can be acquired from the outside (for example, a server on the Internet) via the communication I/F 1508, for example, and can be installed on the HMD 10.

Figure 6:
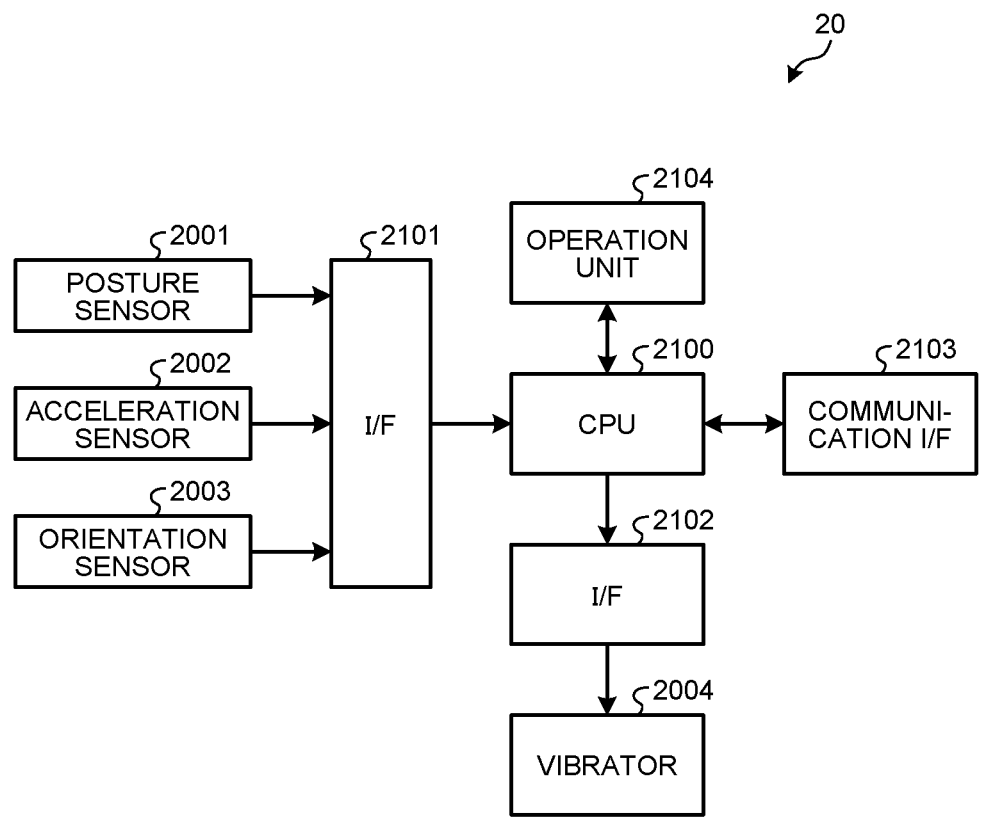
FIG. 6 is a block diagram illustrating a hardware configuration of an example of a controller 20 applicable to the first embodiment.

2-3. Hardware Configuration of an Example of Controller Applicable to the First Embodiment FIG. 6 is a block diagram illustrating a hardware configuration of an example of the controller 20 applicable to the first embodiment. In FIG. 6, in the controller 20, interfaces (I/F) 2101 and 2102, a communication I/F 2103, and an operation unit 2104 are connected to the CPU 2100. The present invention is not limited thereto, and the controller 20 may be configured using a bus that communicably connects the respective units as in the HMD 10 described with reference to FIG. 5. Furthermore, as in the controller 20 illustrated in FIG. 6, the above-described HMD 10 can be configured such that each unit is directly connected to the CPU.

In the example of FIG. 6, the CPU 2100 includes a ROM that stores a program for operating the CPU 2100, and a RAM used as a work memory when the program is executed. Of course, the ROM and the RAM can be connected to the outside of the CPU. The communication I/F 2103 controls communication with the HMD 10 in accordance with a command from the CPU 2100.

The I/F 2101 is an interface for the posture sensor 2001, the acceleration sensor 2002, and the orientation sensor 2003, and sensor signals output from the posture sensor 2001, the acceleration sensor 2002, and the orientation sensor 2003 are supplied to the CPU 2100 via the I/F 2101. The CPU 2100 transmits the sensor signals supplied from the posture sensor 2001, the acceleration sensor 2002, and the orientation sensor 2003 from the communication I/F 2103 to the HMD 10.

The I/F 2102 is an interface for the vibrator 2004. For example, the I/F 2102 generates a drive signal for driving the vibrator 2004 based on a command issued by the CPU 2100 according to a control signal transmitted from the HMD 10 and received by the communication I/F 2103, and supplies the drive signal to the vibrator 2004.

In the operation unit 2104, various operators such as buttons for receiving user operations are disposed. The operation unit 2104 can further include a display device that displays predetermined information. The operation unit 2104 supplies a control signal according to a user operation to the CPU 2100. The CPU 2100 can control the operation of the inside of the controller 20 according to the control signal, and can transmit the control signal to the HMD 10 through the communication I/F 2103.

In the HMD 10, the control unit 100 can control, for example, the virtual space generated by the VR application in the application execution unit 1001 according to the control signal transmitted from the controller 20.

Figure 7A:
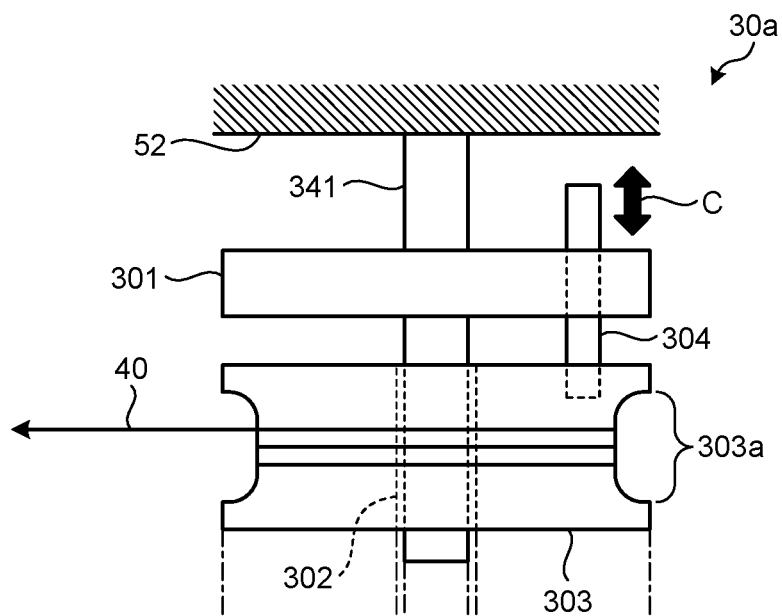
FIGS. 7A and 7B are schematic diagrams illustrating an example of a structure of a wire control device according to the first embodiment.
Figure 7B:
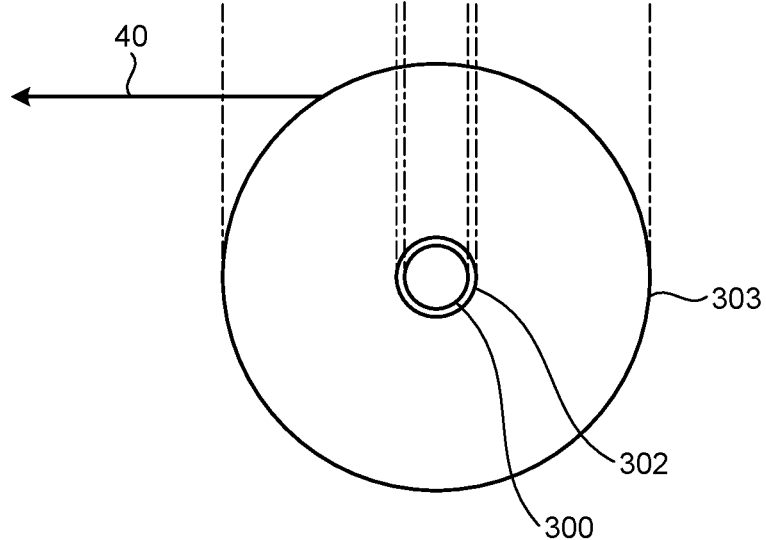

(2-4. Configuration of Wire Control Device According to First Embodiment) Next, a configuration of the wire control device 30a according to the first embodiment will be described. FIGS. 7A and 7B are schematic diagrams illustrating an example of a structure of the wire control device 30a according to the first embodiment. The wire control device 30a is attached to, for example, the body 52 of the user 50 who holds the controller 20 described above. More specifically, it is attached to the armpit of the arm 53 that holds the controller 20 of the body 52 of the user 50 using a belt or the like.

FIG. 7A schematically illustrates the wire control device 30a in a state where the wire control device 30a is attached to the body 52. In FIG. 7A, a state in which the wire control device 30a is viewed from a direction along the body 52 is illustrated. The FIG. 7B schematically illustrates the wire control device 30a viewed from the side. In FIGS. 7A and 7B, the wire control device 30a includes a rotation shaft 300, a lock unit 301, a rotation portion 303, a lock pin 304, and a fixed shaft 341.

Although the fixed shaft 341 is illustrated to directly contact the body 52 in FIG. 7A, the wire control device 30a is actually fixed to the body 52 via a pedestal (not illustrated).

In FIG. 7A, the lock unit 301 is attached to the fixed shaft 341, and the rotation shaft 300 is provided at the center of the lock unit 301. The rotation shaft 300 may be configured by causing the fixed shaft 341 to pass through the lock unit 301. The rotation portion 303 is attached to the rotation shaft 300 so as to be rotatable about a shaft hole 302.

As illustrated in FIG. 7A, the rotation portion 303 is provided with a winding portion 303a at a side, and the wire 40 is wound around the winding portion 303a. The material of the wire 40 is not particularly limited as long as the material has a certain strength or more and is extremely small in expansion and contraction when tension is applied to the wire itself. A material of the wire 40 can be made of, for example, a metal wire. The material of the wire 40 is not limited thereto, and yarns, strings, and the like made of chemical fibers or natural fibers may be used for the wire.

The lock unit 301 includes a lock pin 304 inserted into the rotation portion 303 to lock the rotation of the rotation portion 303, and a drive unit for driving the lock pin 304. The lock unit 301 constitutes a lock mechanism for locking the unwinding of the wire 40.

For example, when the application execution unit 1001 detects contact or collision between the virtual object 500 and the hand 54 (the position tracking unit 21 of the controller 20) in the virtual space, the HMD 10 instructs the wire control device 30a to operate the lock pin 304. In response to this instruction, the lock pin 304 protrudes toward the rotation portion 303 and is inserted into the rotation portion 303. As a result, the rotation of the rotation portion 303 is stopped, and the user 50 can obtain a feeling as if the hand 54 has touched or collided with a real object.

Here, the operation of the lock pin 304 is required to be executed instantaneously. In order to instantaneously operate the lock pin 304 and lock the rotation, it is conceivable to control the operation of the lock pin 304 using, for example, a solenoid. In addition, since the solenoid is only required to be energized during the lock, that is, during the time of the insertion of the lock pin 304 into the rotation portion 303, power consumption can be suppressed, which is preferable.

More specifically, the lock pin 304 is configured as an actuator including a solenoid, and the lock pin 304 moves at a high speed in a direction indicated by an arrow C in the figure according to energization to the solenoid. More specifically, by energizing the solenoid, the lock pin 304 instantaneously moves downward in the figure and protrudes into the rotation portion 303. When the energization to the solenoid is stopped, the lock pin 304 is returned to the original position by a spring mechanism (not illustrated).

As will be described later, the rotation portion 303 is provided with a stopper for the lock pin 304, and the lock pin 304 protruding into the rotation portion 303 contacts the stopper, so that the rotation of the rotation portion 303 can be locked.

Here, in the lock unit 301, the operation of the lock pin 304 is controlled in accordance with an instruction from the control unit 100 of the HMD 10. For example, the lock unit 301 includes a communication I/F that communicates with the HMD 10, a micro-processing unit (MPU), and a solenoid drive unit for driving a solenoid that operates the lock pin 304. A control signal including an instruction to operate the lock pin 304 transmitted from the HMD 10 is received by the communication I/F and passed to the MPU. The MPU generates a drive control signal for driving the solenoid according to the transmitted control signal to transmit the drive control signal to the solenoid drive unit. The solenoid drive unit drives the solenoid in accordance with the transmitted drive control signal.

Figure 8:
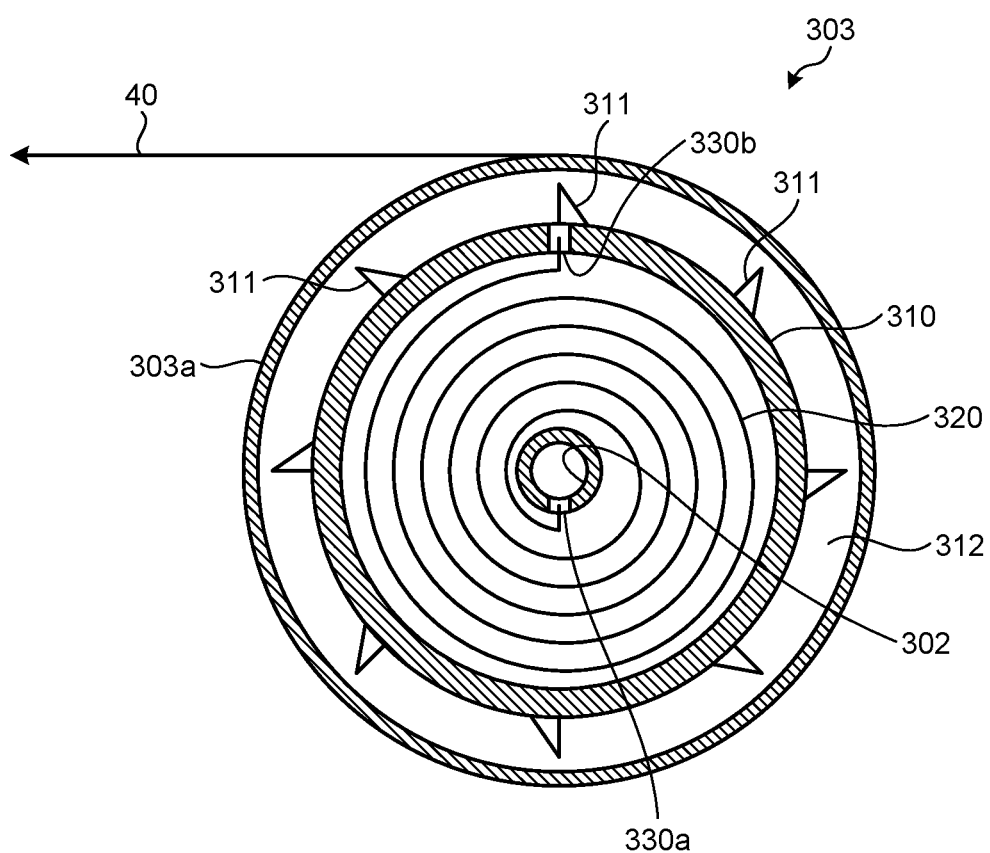
FIG. 8 is a schematic view illustrating a structure of an example of a rotation portion applicable to the first embodiment.

FIG. 8 is a schematic diagram illustrating a structure of an example of the rotation portion 303 applicable to the first embodiment. FIG. 8 is a perspective view of the inside of the winding portion 303a of the rotation portion 303 from the state of FIG. 7B described above.

In FIG. 8, a spiral spring 320 as an elastic body is provided in the region from the wall of the shaft hole 302 to an inner wall 310. One end of the spiral spring 320 is fixed to a fixing portion 330a in the wall of the shaft hole 302, and the other end is fixed to a fixing portion 330b in the inner wall 310. The spiral spring 320 is attached in a direction in which the spiral spring 320 unwinds when the wire 40 wound around the winding portion 303a is unwound.

In the example of FIG. 8, the spiral spring 320 is wound counterclockwise from the outside to the inside, and the spiral spring 320 unwinds by applying a force in a counterclockwise direction. Therefore, the wire 40 is wound around the winding portion 303a clockwise and when it is unwound in the direction indicated by the arrow in FIG. 8, the spiral spring 320 unwinds.

For example, when the user 50 pulls the wire 40, the wire 40 is unwound from the wire control device 30*a*. While the wire 40 is unwound, the tension by the wire 40 exceeds the restoring force of the spiral spring 320, and the wire 40 is pulled in the unwinding direction and remains tensioned. When the wire 40 is unwound until the spiral spring 320 unwinds to a certain degree and then the unwinding of the wire 40 is stopped, the tension by the wire 40 and the restoring force of the spiral spring 320 are balanced, and the wire 40 is kept stretched. When the operation of returning the wire 40 to the wire control device 30*a* from this state is performed, the restoring force of the spiral spring 320 exceeds the tension of the wire 40. In this case, the wire 40 is pulled by the spiral spring 320 and rewound while remaining tensioned.

As described above, for example, even when one end of the wire 40, that is, the end away from the wire control device 30*a*, is connected to the controller 20 held by the user 50 and the user 50 moves the controller 20 within the movable range of the wire 40, the wire 40 can be maintained in a stretched state at all times. In addition, since this operation is performed using the restoring force of the spiral spring 320, the rewinding of the wire 40 and the like can be automatically executed without using electrical control such as a motor. That is, the rotation portion 303 constitutes a winding unit that unwinds the wire 40 having one end movably held by the user 50 in a direction of the one end and winds the wire 40 by an elastic force in a direction away from the one end.

Returning to the description of FIG. 8, a region 312 from the inner wall 310 to the outer wall of the winding portion 303*a* is a region corresponding to the position of the lock pin 304, and the lock pin 304 protrudes from the lock unit 301 by the driving of the solenoid and is inserted into the region 312. A stopper 311 is provided on an outer face of the inner wall 310 of the region 312. When the lock pin 304 is inserted by the driving of the solenoid in a state where the wire 40 is unwound and the rotation portion 303 is rotating, the lock pin 304 contacts the stopper 311, and the rotation of the rotation portion 303 is stopped. That is, the lock unit 301 including the lock pin 304 and the stopper 311 included in the rotation portion 303 constitute a wire lock unit that locks the unwinding of the wire 40 from the winding unit.

In the example of FIG. 8, eight stoppers 311 are provided on the outer face of the inner wall 310 at 45° intervals. The number is not limited to this example, and the stoppers 311 may be provided at finer intervals, or the number of stoppers 311 may be less than 8.

For example, it is assumed that the while the user 50 is performing an operation of holding the controller 20 to which the wire 40 is connected at one end and pushing the controller 20 forward the solenoid is driven in response to an instruction from the HMD 10 and the lock pin 304 is inserted into the rotation portion 303. In this case, the rotation portion 303 rotates in accordance with the unwinding of the wire 40, the lock pin 304 contacts the stopper 311, and the unwinding of the wire 40 is locked. As a result, the user 50 holding the controller 20 receives a force in a direction opposite to a direction in which the operation of pushing the controller 20 is performed, and the pushing operation is stopped.

For example, in the HMD 10, in a case where the virtual object 500 is disposed at a position in the virtual space corresponding to the position of the controller 20, when it is determined that the hand 54 of the user 50 comes in contact with or collides with the virtual object, the application execution unit 1001 transmits an instruction to drive the lock pin 304 to the wire control device 30*a*. In the wire control device 30*a*, since the lock pin 304 is protruded in accordance with this instruction, the user 50 can feel as if the user has received a reaction force in a case where the user touches or collides with a real object, and can enjoy more advanced expression of reality.

2-5. Comparison with Existing Technology

Here, the existing technology will be described and compared with the technology according to the present disclosure.

For example, according to Patent Literature 1, the lengths of a plurality of wires are adjusted by a motor to fix a user's hand or the like at a specific position, so that when the user collides with a virtual object, the hand does not get stuck in the virtual object. In this case, when the wire length is adjusted by the motor, it is necessary to rotate the motor so as to extend the wire in a case where the hand moves in a direction away from the motor (in a case where the hand is pulled), and it is necessary to rotate the motor so as to wind the wire in a case where the hand moves in a direction approaching the motor (in a case where the hand is shrunk). However, in the configuration using the motor, the extension and contraction and the locking of the wire do not follow the quick movement of the user, and a situation in which a hand is stuck in the virtual object may occur.

The first embodiment includes a mechanism that controls the unwinding and winding of the wire 40 using an elastic force and a mechanism that locks the unwinding of the wire 40 using the lock pin 304. Therefore, the wire 40 can be unwound and wound, and the wire 40 can be locked following the movement of the user 50.

In addition, in Patent Document 1, a large number of motors are used, and when it is assumed that the motors are used while moving with difficulty in securing a power supply, a load on the battery due to constant energization of the motors is also large. On the other hand, in the first embodiment, since the wire 40 is unwound and wound using the elastic force, so that power is not consumed when the wire 40 is unwound and wound. In the first embodiment, the wire 40 is unwound by inserting the lock pin 304 into the rotation portion 303. Therefore, power consumption required for controlling the operation of the wire 40 can be suppressed.

Furthermore, as a device that performs haptic presentation at the time of contact, a device called 3D Systems Phantom Premium 1.5 (registered trademark) by 3D Incorporated. is commercially available as designation. This is used by gripping the handle at the tip. The arm can be controlled by the program, and can be moved to a specific position or kept at a fixed position with a specific force. Therefore, the user gripping the handle can obtain a feeling of being attracted to a specific position by a specific force, a feeling of colliding with something, or the like. However, this device is used by being installed on a table, and setting in a home takes time and effort, and it is not possible to realize touching a large object while moving.

On the other hand, the control system according to the first embodiment includes the HMD 10 worn on the head 51 by the user 50, the controller 20 (position tracking unit 21) held by the hand 54, and the wire control device 30*a* worn on the body 52 by the user 50. Therefore, it is easy to use the system while moving, and setting can be simplified.

2-6. Modification of First Embodiment

First Modification

Note that, in the above description, in a case where it is determined that the hand 54 of the user 50 has come in contact with or collided with the virtual object, the unwinding of the wire 40 is locked, but the present invention is not limited to this example. For example, in the HMD 10, in a case where it is determined that the hand 54 of the user 50 has come in contact with or collided with the virtual object, the application execution unit 1001 may further instruct the vibration presentation unit 1203 to present vibration and operate the vibrator 2004 included in the controller 20. As a result, the user 50 can feel an impact at the time of contact or collision as well as a reaction force at the time of contact or collision with a real object.

Second Modification

In the above description, one end of the wire 40 is fixed to the hand 54 (the controller 20), and the other end (the wire control device 30*a*) is fixed to the armpit of the body 52 of the user 50, but the present invention is not limited to this example. As a method of fixing one end and the other end of the wire 40, for example, the following variations are also conceivable.

One end of the wire 40 is fixed to the hand 54 (controller 20), and the other end (the wire control device 30*a*) is fixed to the environment (a wall, a desk, or the like) around the user 50. In this case, it is possible to express the feeling that the hand 54 has collided with the virtual object 500.

One end of the wire 40 is fixed to the toe portion of the user 50, and the other end is fixed to the waist. In this case, it is possible to express the feeling that the foot of the user 50 has collided with the virtual object 500.

One end of the wire 40 is fixed to the head 51 of the user 50, and the other end is fixed to the environment (a wall, a desk). In this case, a feeling such as heading of soccer can be expressed.

One end of the wire 40 is fixed to the shoulder of the user 50, and the other end is fixed to the environment (a wall, a desk). In this case, a feeling such as a tackle can be expressed.

Third Modification

In the control system according to the first embodiment, the wire control device 30*a* and the position tracking unit 21 (controller 20) are connected by the wire 40. Therefore, the length of the currently unwound portion of the wire 40 can be estimated based on the rotation amount of the rotation portion 303 of the wire control device 30*a*, and the position of the position tracking unit 21 (controller 20) can be narrowed down. As described above, the tracking information can be corrected by the position tracking unit 21 (controller 20) using the length of the unwound portion of the wire 40.

Fourth Modification

In addition, an electric cable can be used as the wire 40. As a result, power can be sent from the wire control device 30*a* to the controller 20 or from the controller 20 to the wire control device 30*a*. As a result, the installation position of the battery can be set on both the controller 20 and the wire control device 30*a*, and the degree of freedom of design or usage can be increased. When an electric cable is used as the wire 40, a control signal can be transmitted using the electric cable.

Fifth Modification

In addition, the wire 40 may be tubular, and air or water may be sent from the wire control device 30*a* to the controller 20 through the wire 40, for example. As a result, it is possible to realize a performance to splash water or a performance to blow out air at the controller 20.

Sixth Modification

As described above, the control system according to the first embodiment can use the mechanism for locking the unwinding of the wire 40 to make a virtual collision between the hand 54 and the virtual object 500 in the virtual space a more realistic representation of the collision. Therefore, it is also applicable to an expression in which the hand 54 collides with the virtual object 500 when the user 50 stretches the arm 53 in a VR content such as work training, and an expression in which a monster is hit and repelled in a VR game as one of VR contents, and the like.

Seventh Modification

Furthermore, it is also conceivable that the user 50 pulls the wire 40 with an extremely strong force to break the wire control device 30*a*. In this case, the wire control device 30*a* may be protected by intentionally preventing the unwinding of the wire 40 in the wire control device 30*a* from being locked. For example, it is conceivable to introduce a mechanism in which the lock pin 304 is lifted up and the lock by the lock pin 304 is released when the wire 40 is pulled with a certain force or more. Specifically, it is conceivable that the stopper 311 has a shape in which the angle of the face which the lock pin 304 contacts when locked is increased.

Eighth Modification

Furthermore, it is also conceivable that an unexpected force acts on the wire control device 30*a* and the wire control device 30*a* is broken. In this case the fact that the wire control device 30*a* is broken may be indicated by displaying a video indicating that a handheld tool is broken, for example, in a video in the virtual space. For example, it is conceivable that a gyro sensor that detects the posture is provided in the rotation portion 303 in the wire control device 30*a* and the breakage of the wire control device 30*a* is detected using the output of the gyro sensor.

For example, even though it is detected that the hand 54 is moving based on each sensor signal of the position tracking unit 21, the rotation portion 303 of the wire control device 30*a* does not rotate, and the gyro sensor provided in the rotation portion 303 returns an abnormal value (for example, a value contradicting the movement of the hand 54) and the like, whereby breakage of the wire control device 30*a* can be detected.

Ninth Modification

In addition, even when a virtual collision between the hand 54 and the virtual object 500 in the virtual space does not occur, the wire 40 may be locked for unwinding in the following cases.

In a case where the controller 20 (position tracking unit 21) held by the user 50 is away from the body of the user 50 by the length of the arm 53 or more. In this case, it can be regarded that the user 50 has dropped or thrown the controller 20.

The controller 20 (position tracking unit 21) is provided with a sensor that detects whether the controller 20 is held, and a state in which the controller 20 is not held is detected from a detection result by the sensor. In this case, instead of providing the sensor, for example, a button that is brought into an operation (pressing) state by holding the controller 20 may be provided.

3. Second Embodiment

3-1. Overview of Second Embodiment

Next, the second embodiment of the present disclosure will be described. In the second embodiment, when the unwinding of the wire 40 is locked in the above-described first embodiment, the distance of one end of the wire 40 from the reference position is further changed within a predetermined range. This makes it possible to express the elasticity of the virtual object 500 when the hand 54 virtually contacts or collides with the virtual object 500 in the virtual space.

Here, one end of the wire 40 is an end to which the controller 20 is connected, and the reference position corresponds to, for example, a position at which the wire control device according to the second embodiment is mounted or installed.

Figure 9:
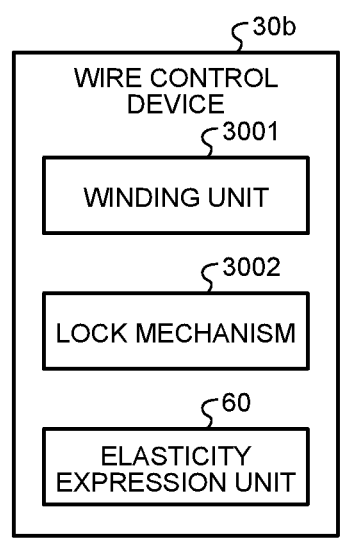
FIG. 9 is a functional block diagram of an example for explaining functions of a wire control device according to the second embodiment.

FIG. 9 is a functional block diagram of an example for explaining the functions of a wire control device 30b according to the second embodiment. Note that, in the second embodiment, the functions of the HMD 10 and the controller 20 are equivalent to those of the HMD 10 and the controller 20 according to the first embodiment described with reference to FIG. 4, and thus description thereof is omitted here.

In a wire control device 30b illustrated in FIG. 9, an elasticity expression unit 60 is added to the wire control device 30a described with reference to FIG. 4. The elasticity expression unit 60 has a function of changing a distance between one end and the reference position of the wire 40 within a predetermined range in a state where tension is applied to the wire 40 in a state where unwinding of the wire 40 is locked by the lock mechanism.

Figure 10:
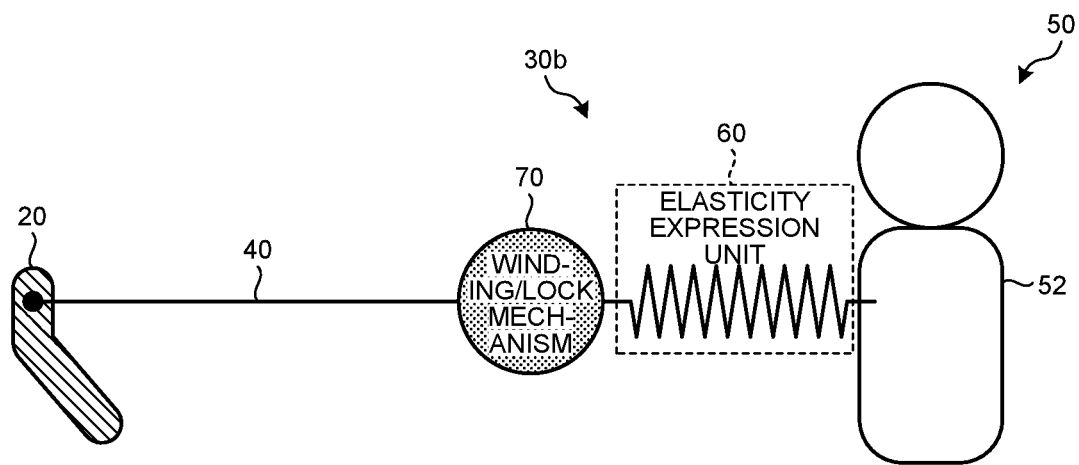
FIG. 10 is a schematic diagram schematically illustrating a control system according to a second embodiment.

FIG. 10 is a schematic diagram schematically illustrating a control system according to the second embodiment. In FIG. 10, the configuration including the winding unit 3001 and the lock mechanism 3002 is collectively illustrated as a winding/lock mechanism 70. The winding/lock mechanism 70 corresponds to the wire control device 30a described in the first embodiment. Hereinafter, the winding/lock mechanism 70 and the elasticity expression unit 60 will be collectively referred to as the wire control device 30b.

In FIG. 10, the elasticity expression unit 60 is provided between the winding/lock mechanism 70 and the reference position, for example, the position of the body 52 to which the wire control device 30b is attached. In other words, the elasticity expression unit 60 is mounted at the reference position such as the body 52, and the elasticity expression unit 60 is connected to the winding/lock mechanism 70. The wire 40 unwound from the winding/lock mechanism 70 is connected to the controller 20.

In such a configuration, the winding/lock mechanism 70 locks the unwinding of the wire 40 according to an instruction from the HMD 10, for example. In this state, when the user 50 tries to push the controller 20 forward, the elasticity expression unit 60 changes the distance from the reference position to the controller 20 according to the pushing force.

In this way, after the hand 54 virtually contacts or collides with the virtual object 500 in the virtual space, the user 50 can further press the virtual object 500 by the distance changed by the elasticity expression unit 60. Alternatively, the user is pushed back by the distance changed by the elasticity expression unit 60. As a result, the user 50 can feel as if the surface of the virtual object 500 has elasticity, and can enjoy more advanced reality expression.

Hereinafter, some examples of a method capable of realizing the elasticity expression according to the second embodiment will be described.

Figure 11:
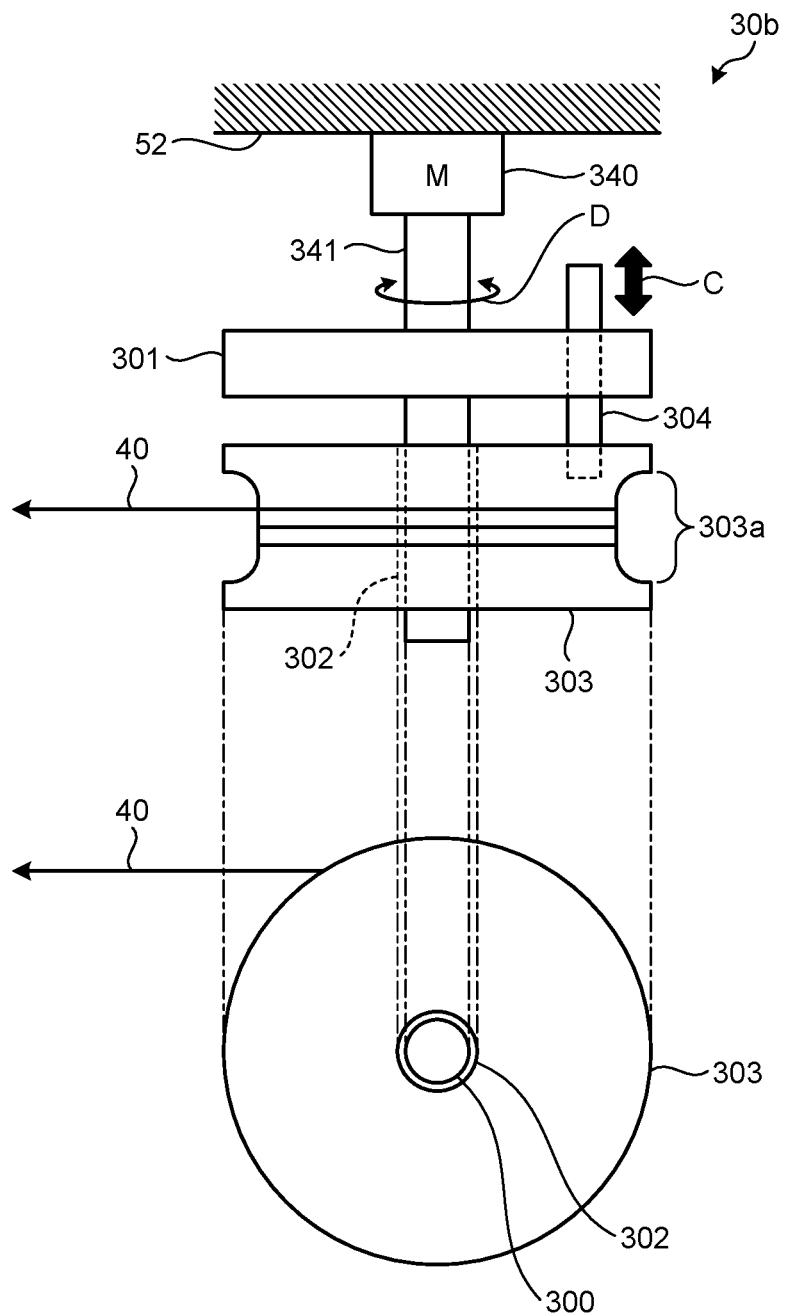
FIGS. 11A and 11B are schematic diagrams illustrating an example of a structure of a wire control device according to a first example of the second embodiment.

(3-2. First example of second embodiment) First, the first example of the second embodiment will be described. The first example of the second embodiment is an example in which the elasticity expression unit 60 is configured with a motor. FIGS. 11A and 11B are schematic diagrams illustrating an example of a structure of the wire control device 30b according to the first example of the second embodiment. The wire control device 30b illustrated in FIGS. 11A and 11B are obtained by adding a motor 340 using the fixed shaft 341 as a rotation shaft to the wire control device 30a described with reference to FIGS. 7A and 7B.

In the structure of FIGS. 11A and 11B, the fixed shaft 341 rotates counterclockwise and clockwise by the motor 340, for example, as indicated by an arrow D in the figure. When the motor 340 is rotated, the lock unit 301 connected to the fixed shaft 341 is rotated. That is, the position of the lock pin 304 also rotates with the rotation of the lock unit 301. On the other hand, since the rotation portion 303 rotates with respect to the rotation shaft 300, the rotation portion rotates regardless of the operation of the motor 340.

Here, the motor 340 is driven and controlled so as to maintain a predetermined rotation angle, for example. That is, when a clockwise force is applied to the fixed shaft 341 (lock unit 301), the fixed shaft is driven to rotate counterclockwise, and when a counterclockwise force is applied to the fixed shaft 341, the fixed shaft is driven to rotate clockwise. The motor 340 may be a servomotor as a motor capable of such driving. By incorporating such a motor 340 into a base portion (in the example of FIGS. 11A and 11B, between the lock unit 301 and the body 52) of the wire control device 30a, elasticity is expressed with respect to the force of pulling the wire 40 in the direction of the controller 20.

That is, until the hand 54 (controller 20) virtually collides with the virtual object 500 in the virtual space, the wire 40 is unwound according to the pulling force of the wire 40 by the rotation portion 303 including the spiral spring 320. In a case where the hand 54 virtually collides with the virtual object 500 in the virtual space, as described above, the lock pin 304 is inserted into the rotation portion 303 according to the instruction from the HMD 10, and unwinding of the wire 40 is locked.

Here, in a case where a pulling force is continuously applied to the wire 40, the force is transmitted from the rotation portion 303 to the lock unit 301 via the lock pin 304, and acts as a force for rotating the fixed shaft 341. Since the motor 340 is driven so that the rotation angle is maintained at a predetermined angle, the motor is driven in a direction to cancel the rotation of the fixed shaft 341. The driving force is transmitted to the rotation portion 303 via the lock unit 301 and the lock pin 304, and acts as a force for rotating the rotation portion 303. As a result, a pulling force toward the reference position (for example, the position of the wire control device 30b) acts on the wire 40, and the pulling force is transmitted to the hand 54 of the user 50 holding the controller 20 connected to one end of the wire 40.

The user 50 will feel the force as if the hand 54 is pulled back from the virtual object 500 or repelled by the virtual object 500 after the user 50 obtains the feeling of the hand 54 virtually contacting or colliding with the virtual object 500. As a result, the user 50 can virtually feel the elasticity at the time of contact or collision with the virtual object 500, and the elasticity at the time of collision with the virtual object 500 is expressed.

Figure 12:
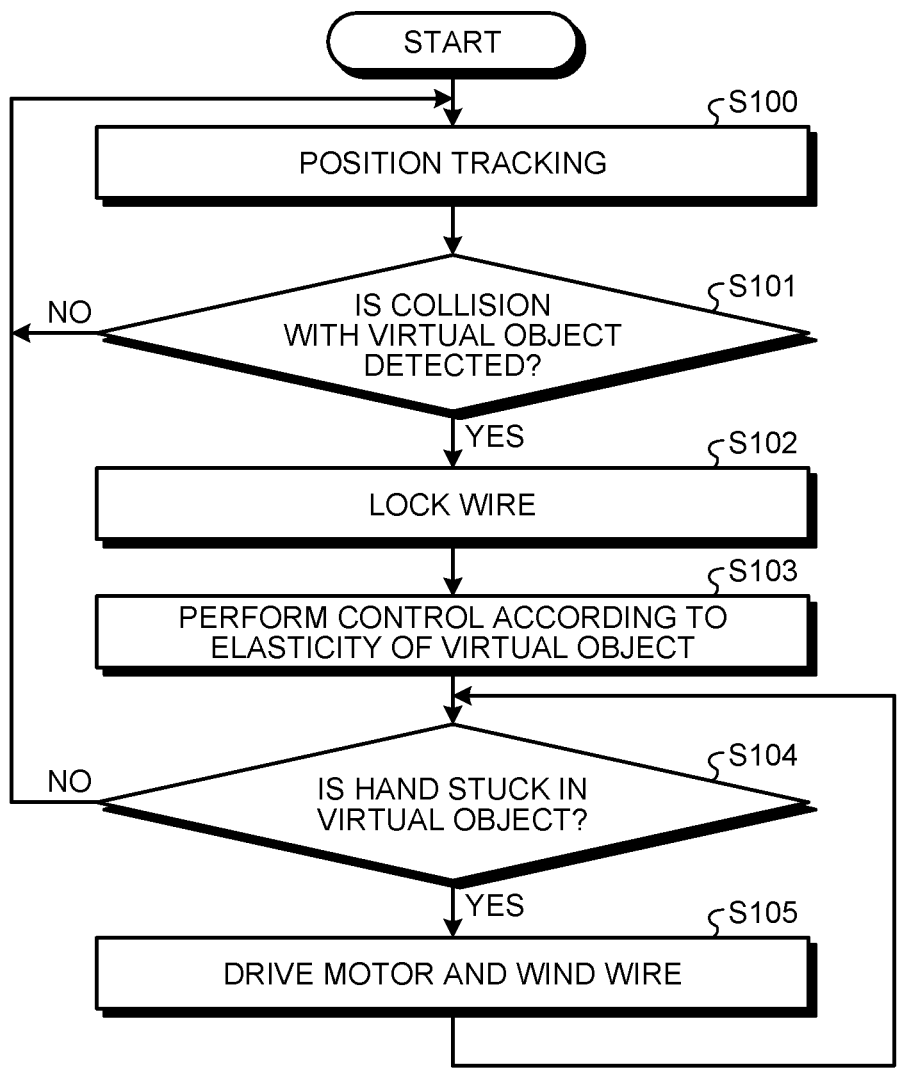
FIG. 12 is a flowchart of an example illustrating control according to the first example of the second embodiment.

FIG. 12 is a flowchart of an example illustrating control according to the first example of the second embodiment. Here, the description will be given assuming that the virtual space in which the virtual object 500 is disposed is displayed in the HMD 10 and the user 50 wearing the HMD 10 holds the controller 20 with the hand 54.

In Step S100, the control unit 100 performs the position tracking of the controller 20 (position tracking unit 21) based on the tracking information transmitted from the controller 20 to acquire the current position of the controller 20. In the next Step S101, the control unit 100 determines whether a collision between the hand 54 of the virtual user 50 in the virtual space and the virtual object 500 in the virtual space has been detected based on the information about the current position of the controller 20 acquired by the position tracking in Step S100. When it is determined that no collision is detected (Step S101, "No"), the control unit 100 returns the process to Step S100.

On the other hand, in a case where the control unit 100 determines that a collision is detected, the process proceeds to Step S102. In Step S102, the control unit 100 instructs the wire control device 30b to lock the unwinding of the wire 40. In response to this instruction, the wire control device 30b drives the lock pin 304 to lock the unwinding of the wire 40.

In the next Step S103, the control unit 100 performs control according to the elasticity of the virtual object 500 the collision with which is detected. For example, the control unit 100 instructs the vibration presentation unit 1203 to generate vibration according to elasticity based on the elasticity information set in the virtual object 500. The vibration presentation unit 1203 generates a control signal in response to the instruction to transmit the generated control signal to the controller 20. In the controller 20, the vibrator 2004 generates vibration in accordance with a control signal. As an example, it is conceivable that in a case where low elasticity is set for the virtual object 500 the collision with which is detected, strong vibration may be generated short, and in a case where high elasticity is set, weak vibration may be generated long.

In the next Step S104, the control unit 100 determines in Step S101 whether the hand 54 of the user 50 is stuck in the virtual object 500 the collision with which is detected based on the information about the current position of the hand 54 (position tracking unit 21) acquired in Step S100. In a case where the control unit 100 determines that the hand 54 of the user is not stuck in the virtual object 500 (Step S104, "No"), the process returns to Step S100.

On the other hand, when the control unit 100 determines that the hand 54 of the user is stuck in the virtual object 500 the collision with which is detected (Step S104, "Yes"), the process proceeds to Step S105. In Step S105, the control unit 100 drives the motor 340 to wind the wire 40. As a result, a pulling force toward the reference position (for example, the position of the wire control device 30b) acts on the controller 20, and the user 50 can obtain a feeling that the hand 54 is pushed back on the surface of the virtual object 500, and the elasticity of the virtual object 500 is expressed.

When the motor 340 is driven in Step S105, the process returns to Step S104.

The control according to the first example of the second embodiment will be described more specifically with reference to FIGS. 13A, 13B, 13C, 13D, 14A, 14B, and 14C.

Note that, in FIGS. 13A, 13B, 13C, 13D, 14A, 14B, and 14C, the virtual object 500 is divided into a portion (referred to as a solid portion 501) whose shape does not change due to an external force and a portion (referred to as an elastic portion 502) which has elasticity and whose shape changes due to an external force. In addition, the elastic portion 502 has a thickness d in a state where no external force is applied. The thickness d is a width that allows the virtual object 500 to expand and contract for elastic expression. When an external force is applied, that is, when a pushing force acts toward the solid portion 501, the thickness d of the elastic portion 502 changes (decreases).

Figure 13A:
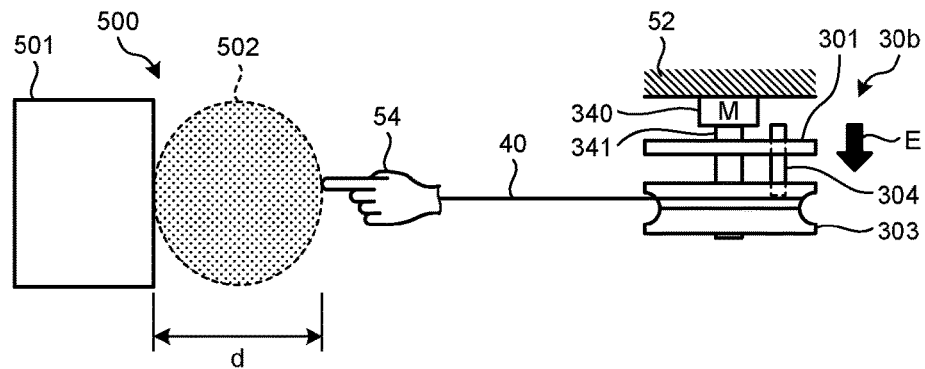
FIGS. 13A, 13B, 13C, and 13D are schematic diagrams for explaining lock and elastic control of a wire in a case of pushing a virtual object according to the first example of the second embodiment.

FIGS. 13A, 13B, 13C, and 13D are schematic diagrams for explaining lock and elastic control of the wire 40 in a case of pushing the virtual object 500 according to the first example of the second embodiment. In FIGS. 13A, 13B, 13C, and 13D, as illustrated in FIG. 13A, when the contact of the hand 54 with the elastic portion 502 of the virtual object 500 is detected, the wire control device 30b operates the lock pin 304 to lock the unwinding of the wire 40 as indicated by an arrow E in response to an instruction from the control unit 100.

Figure 13B:
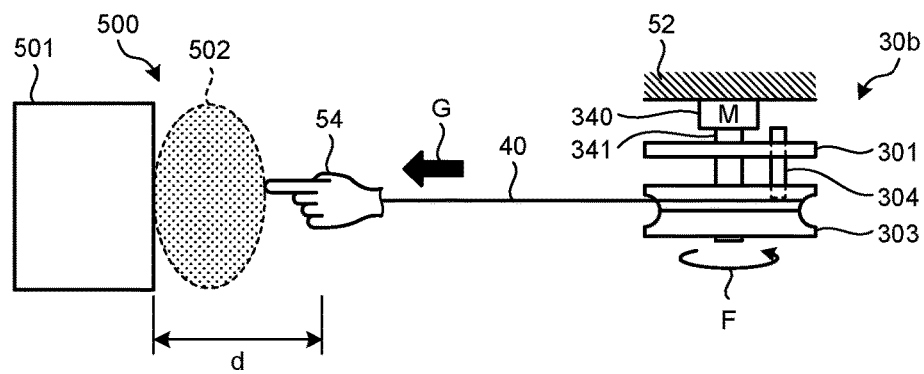

As illustrated in FIG. 13B, when the elastic portion 502 of the virtual object 500 is further pushed by the hand 54, the motor 340 is rotationally driven in the direction of winding the wire 40 according to the pushed width (indicated by an arrow F) while the lock of the unwinding of the wire 40 by the lock pin 304 is continued. As a result, a pulling force acts on the hand 54 in the direction toward the wire control device 30b. At this time, when a force with which the hand 54 pushes the virtual object 500 is stronger than a force with which the wire 40 is wound, the wire is pulled back in the direction opposite to the direction in which the motor 340 is rotationally driven, and as a result, the wire 40 is further unwound.

Figure 13C:
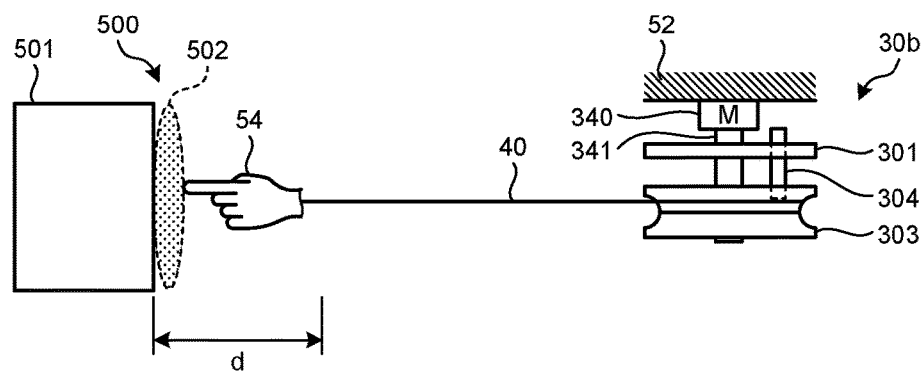

FIG. 13C illustrates an example of a case where the elastic portion 502 of the virtual object 500 is pushed to a position where the elastic portion is not contracted any more in a state where the lock pin 304 continues to lock the unwinding of the wire 40. In this state, the motor 340 is driven so as not to rotate in the direction in which the wire 40 is further unwound. For example, the motor 34 is driven such that a force with which the hand 54 pushes the virtual object 500, that is, a force with which the wire 40 is unwound, and a force with which the motor 340 pulls the wire 40 are balanced.

Figure 13D:
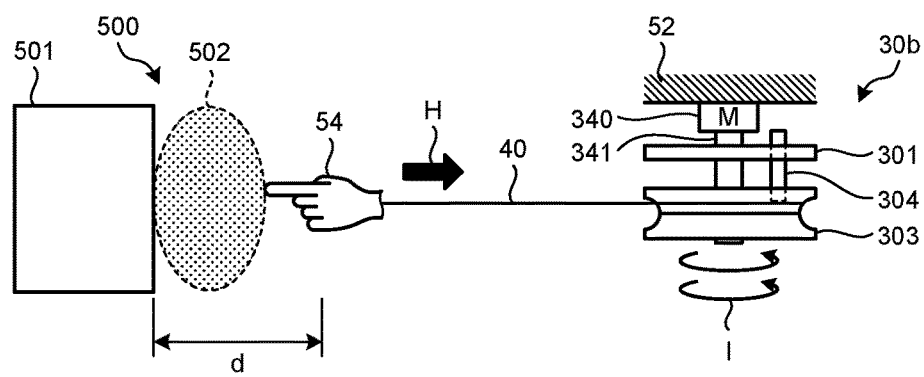

FIG. 13D illustrates a state in which the pushing of the hand 54 against the elastic portion 502 is weakened from the state of FIG. 13C. The control in this case is similar to the control described in the FIG. 13C. That is, the motor 340 is rotationally driven in a direction in which the wire 40 is not unwound, that is, in a direction in which the wire 40 is pulled, while the lock of the wire 40 by the lock pin 304 is continued.

Thereafter, although not illustrated, when the hand 54 is away from the virtual object 500 (the elastic portion 502), the lock of the unwinding of the wire 40 by the lock pin 304 is released, and the wire 40 is rewound by the restoring force of the spiral spring 320. In this case, the force by the motor 340 does not act on the wire 40.

Through the series of operations in FIGS. 13A, 13B, 13C, and 13D described above, the user 50 can feel the elasticity in the virtual object 500.

Figure 14A:
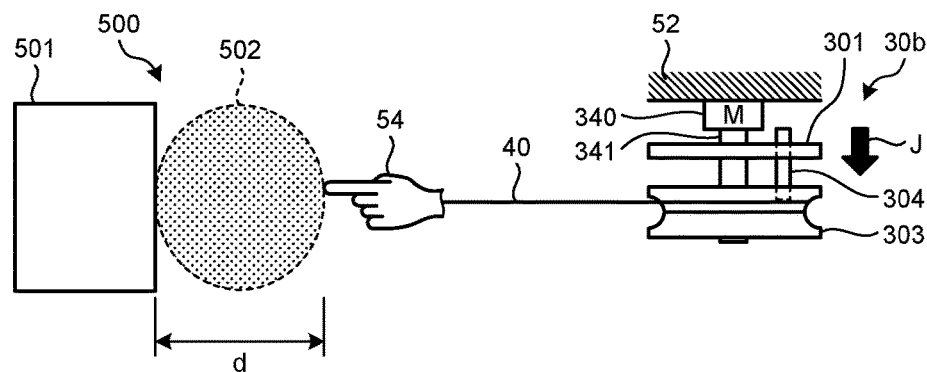
FIGS. 14A, 14B, and 14C are schematic diagrams for explaining lock and elastic control of a wire in a case where a virtual object approaches a user according to the first example of the second embodiment.
Figure 14B:
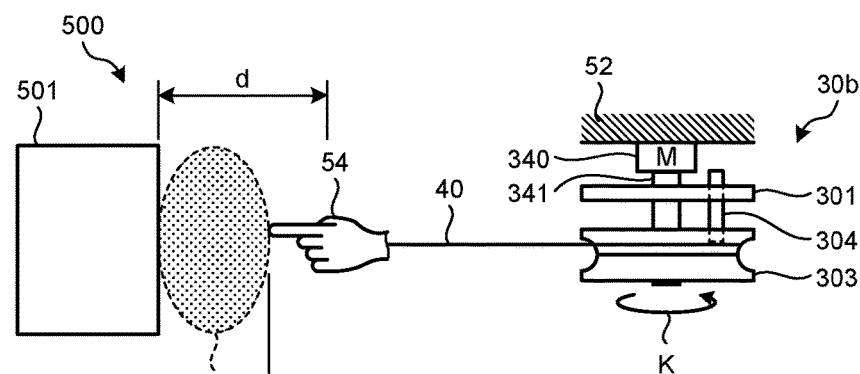
Figure 14C:
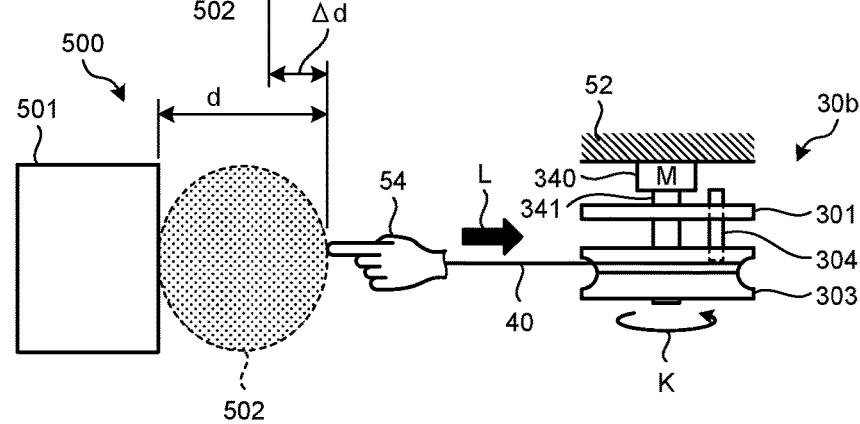

FIGS. 14A, 14B, and 14C are schematic diagrams for explaining lock and elastic control of the wire 40 in a case where the virtual object 500 approaches the user 50 according to the first example of the second embodiment.

First, as illustrated in FIG. 14A, the hand 54 comes into contact with the elastic portion 502 of the virtual object 500 as in FIG. 13A described above. When this contact is detected, the wire control device 30b operates the lock pin 304 as indicated by an arrow J in response to an instruction from the control unit 100 to lock the unwinding of the wire 40.

FIG. 14B illustrates a state in which the virtual object 500 approaches the user 50 in a state in which the lock of the unwinding of the wire 40 is continued and the position of the hand 54 is not changed from the position of the hand 54 in FIG. 14A. In this case, the thickness d of the elastic portion 502 of the virtual object 500 decreases according to a distance Ad by which the virtual object 500 approaches the user 50.

The motor 340 is rotationally driven (indicated by an arrow K) such that the wire 40 is wound by a length corresponding to this distance Ad. That is, a state illustrated in FIG. 14B is equivalent to a state in which the elastic portion 502 is pushed by the hand 54 by the thickness corresponding to the distance Ad illustrated in FIG. 14B from a state in which the virtual object 500 approaches the user 50 by the distance Ad and the hand 54 (fingertip) comes into contact with the virtual object 500 (elastic portion 502) illustrated in the FIG. 14C.

From the state of FIG. 14B, the wire 40 is wound by a length corresponding to the distance Ad by the motor 340 (indicated by an arrow L). As a result, the user 50 can enjoy the feeling that the virtual object 500 approaches the user 50 and the hand 54 is pushed back by the virtual object 500.

As described above, in the first example of the second embodiment, when the hand 54 virtually collides with the virtual object 500, the unwinding of the wire 40 is locked, and the motor 340 performs the winding operation of the wire 40 according to the pushing operation of the hand 54 or the virtual approach of the virtual object 500 to the user 50. As a result, the user 50 can virtually feel the elasticity of the virtual object 500, and can express the elasticity.

In the first example of the second embodiment, the hardness of the wire 40 is temporarily changed so that the wire 40 is not bent, and the wire 40 is rotated by the motor 340 in a direction opposite to a direction in which the wire 40 is wound, whereby it is possible to perform an expression in which the controller 20 (position tracking unit 21) is pushed in a direction away from the body of the user 50. It is conceivable that a method of changing the hardness of the wire 40 includes a method in which the wire 40 is formed in a flat shape and the wire 40 is twisted or bent in the width direction so as not to be bent, a method in which the wire 40 is filled with liquid or the like and the pressure thereof is increased so as not to be bent, and the like.

Figure 15A:
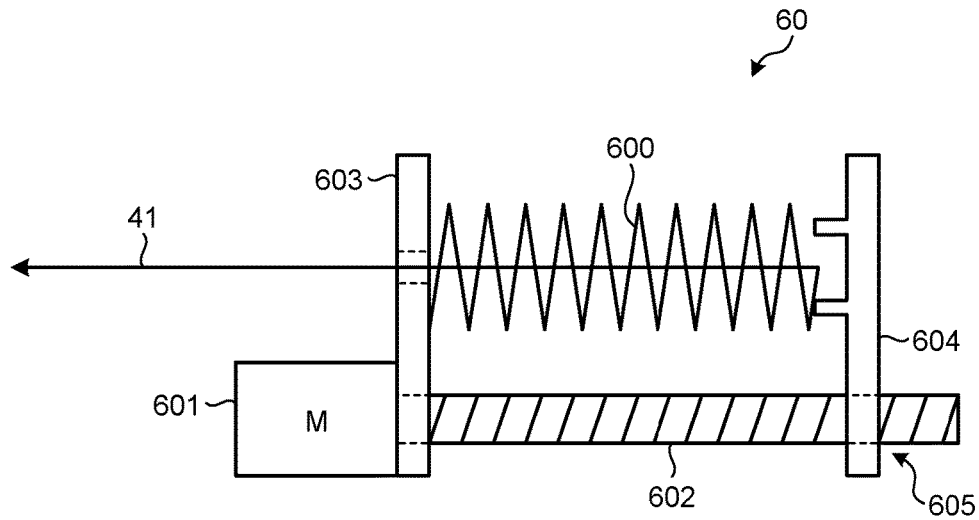
FIGS. 15A and 15B are schematic diagrams illustrating an example of a structure of an elasticity expression unit according to a second example of the second embodiment.
Figure 15B:
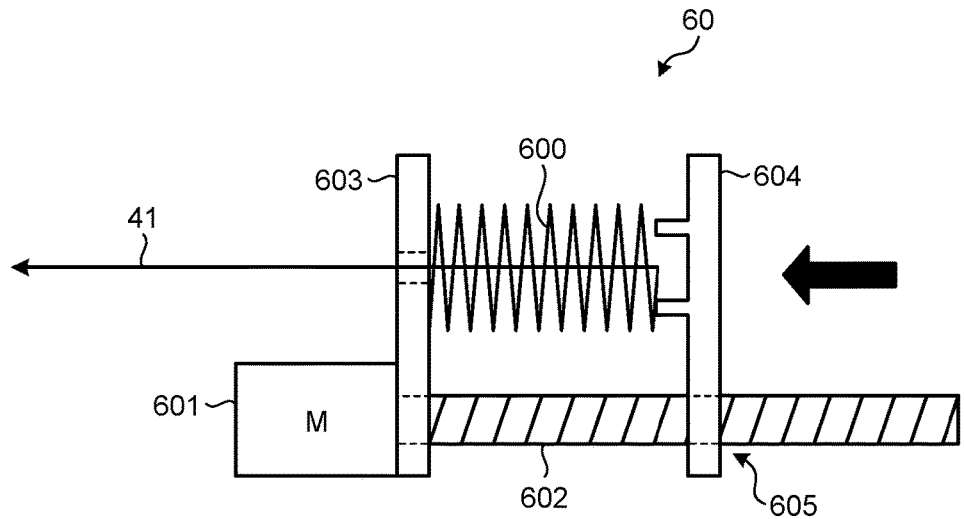
Figure 16A:
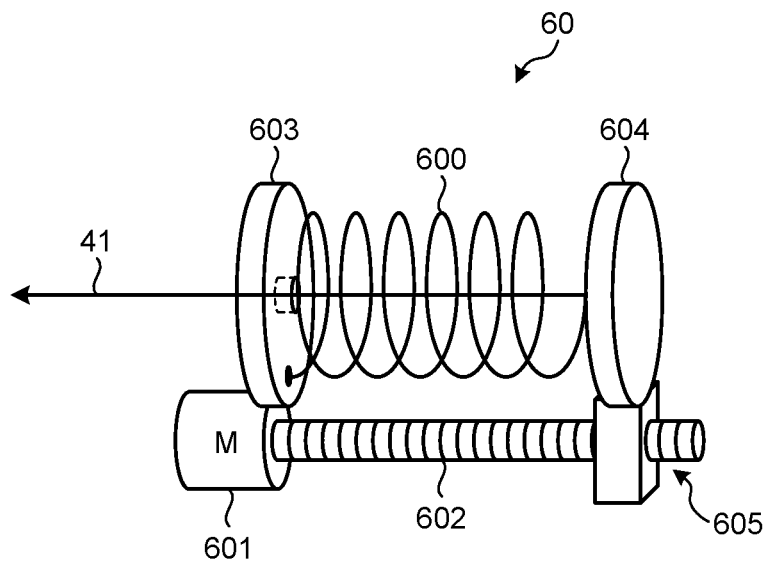
FIGS. 16A and 16B are schematic diagrams illustrating an example of a structure of an elasticity expression unit according to the second example of the second embodiment.
Figure 16B:
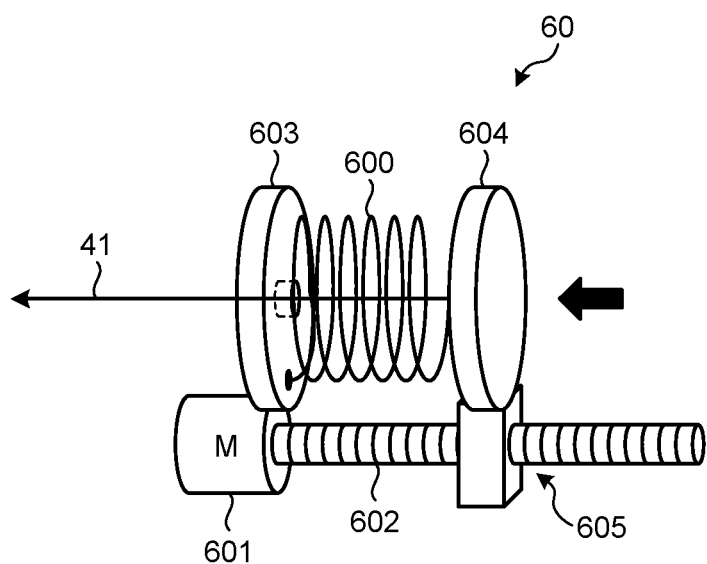

(3-3. Second example of second embodiment) Next, a second example of the second embodiment will be described. The second example of the second embodiment is an example in which the elasticity expression unit 60 is configured with an elastic body. FIGS. 15A, 15B, 16A, and 16B are schematic diagrams illustrating an example of a structure of the elasticity expression unit 60 according to the second example of the second embodiment. FIGS. 15A and 15B schematically illustrate a side view of the elasticity expression unit 60 according to a second example of the second embodiment, and FIGS. 16A and 16B schematically illustrate a perspective view of the elasticity expression unit 60.

As illustrated FIGS. 15A and 16A, the elasticity expression unit 60 includes a coil spring 600 as an elastic body. The coil spring 600 has a structure in which one end is attached to a base portion 603 and the other end is pushed toward the base portion 603 by a lid portion 604. The other end of the coil spring 600 is bent in the direction of the base portion 603 and drawn out through a hole portion provided in the central portion of the base portion 603.

A wire portion 41 from which the end of the coil spring 600 is drawn out is connected to the winding/lock mechanism 70. That is, when the wire 40 is pulled forward of the user 50 in a state where the unwinding of the wire 40 is locked by the winding/lock mechanism 70, the tension of the wire 40 due to the pulling is transmitted to the coil spring 600 via the wire portion 41. As a result, the coil spring 600 contracts, and the restoring force of the contracted coil spring 600 acts on the wire 40 via the wire portion 41.

In addition, a motor 601 driven according to the control of the control unit 100 is provided in the base portion 603. In this example, a rotation shaft 602 of the motor 601 has a threaded structure. By combining the rotation shaft 602 with a hole portion 605 in which the corresponding threads are cut in the lid portion 604, the position of the lid portion 604 can be moved in the direction along the rotation shaft 602 by the rotation of the motor 601, and the length of the coil spring 600 can be changed. FIGS. 15B and 16B illustrate a state where the lid portion 604 is moved in a direction of an arrow in the figure to contract the coil spring 600.

Here, an effect in a case where the coil spring 600 is contracted will be described with reference to FIGS. 15A and 15B. By contracting the coil spring 600 from the state of FIG. 15A to the state in FIG. 15B, the contractable length of the coil spring 600 is shortened. In addition, in order to further contract the coil spring 600 in a state in which the contractable length is shortened, a larger force is required as compared with the case in FIG. 15A where the coil spring 600 in a state of not being contracted relative to FIG. 15B is contracted.

That is, the coil spring 600 in the state of FIG. 15A (referred to as a non-contracted coil spring 600) and the coil spring 600 in the state of being contracted relative to FIG. 15A in FIG. 15B (referred to as a contracted coil spring 600) are compared as follows.

The retractable length of the non-contracted coil spring 600 is longer than that of the contracted coil spring 600.

The force required to contract by a certain length from the initial state of the contracted coil spring 600 is greater than that of the non-contracted coil spring 600.

Therefore, in a case where the virtual object 500 to be contacted or collided by the hand 54 is set as a soft object, the control unit 100 drives the motor 601 to widen the contractable range of the coil spring 600 as in FIG. 15A. In this state, since the force is not applied to the coil spring 600 by the wire portion 41 at first, the reaction force when the coil spring 600 is pulled by the wire portion 41 is weak, which is an expression of touching a soft object.

In this case, when the coil spring 600 is further pulled by the wire portion 41 and reaches the limit of contraction, it is possible to express a state in which a soft object is pushed in and does not contract any more.

On the other hand, in a case where the virtual object 500 to be contacted or collided by the hand 54 is set as a hard object, the control unit 100 drives the motor 601 to narrow the contractable range of the coil spring 600 as in FIG. 15B. In this state, the coil spring 600 has already been contracted, so that a stronger force is required to further contract, and the contractable length is also short.

As described above, by using the elastic body, it is possible to express the elasticity of the virtual object 500 when the hand 54 virtually contacts or collides with the virtual object 500.

The method for adjusting the length of the coil spring 600 is not limited to the method using the motor 601 and the rotation shaft 602 as a screw as long as the method can cope with the restoring force of the coil spring 600.

In addition, by finely expanding and contracting the contractable length of the coil spring 600 in a state where unwinding of the wire 40 is locked, it is possible to generate vibration at a point (the controller 20) where the tip of the wire 40 is fixed. In this case, it is possible to apply vibration to the hand 54 holding the controller 20 without incorporating the vibrator 2004 in the controller 20.

3-4. Third Example of Second Embodiment

Figure 17:
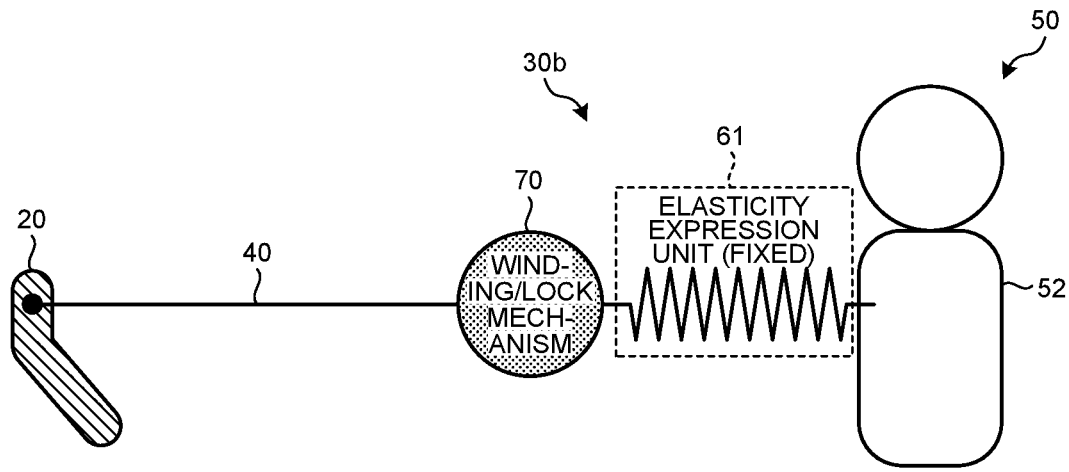
FIG. 17 is a schematic diagram illustrating a configuration of an example of a control system according to a third example of the second embodiment.

Next, the third example of the second embodiment will be described. The third example of the second embodiment is an example in which the configuration of changing the contractable length of the coil spring 600 is not included unlike the elasticity expression unit 60 in the above-described second example. FIG. 17 is a schematic diagram illustrating a configuration of an example of a control system according to the third example of the second embodiment. In FIG. 17, the wire control device 30b includes a winding/lock mechanism 70 and an elasticity expression unit 61.

The elasticity expression unit 61 is obtained by removing the configuration for variably controlling the elasticity from the elasticity expression unit 60 described with reference to FIG. 10. For example, the elasticity expression unit 61 has a configuration in which the motor 601 is removed from the elasticity expression unit 60 described with reference to FIGS. 15A, 15B, 16A, and 16B in the second example of the second embodiment.

According to this configuration, when the hand 54 holding the controller 20 is moved forward, the reaction force generated by the elasticity expression unit 61 is constant. On the other hand, in a case where the hand 54 of the user 50 virtually comes in contact with or collides with the virtual object 500, the HMD 10 generates a video or a sound representing the contact or the collision, and reproduces the video or the sound in the HMD 10. As an example, the HMD 10 changes the presentation content of the contacted or collided virtual object 500.

More specifically, the HMD 10 changes the shape of the contacted or collided virtual object 500, and updates the screen of the display unit 1201 using the image of the virtual object 500 whose shape has been changed. Furthermore, the HMD 10 generates a sound according to contact or collision with the virtual object 500 to output the sound by the sound output unit 1202. By changing these shape and the generated sound according to the degree of contact or collision, it is possible to change the elasticity that can be felt by the user 50.

3-5. Fourth Example of Second Embodiment

Figure 18:
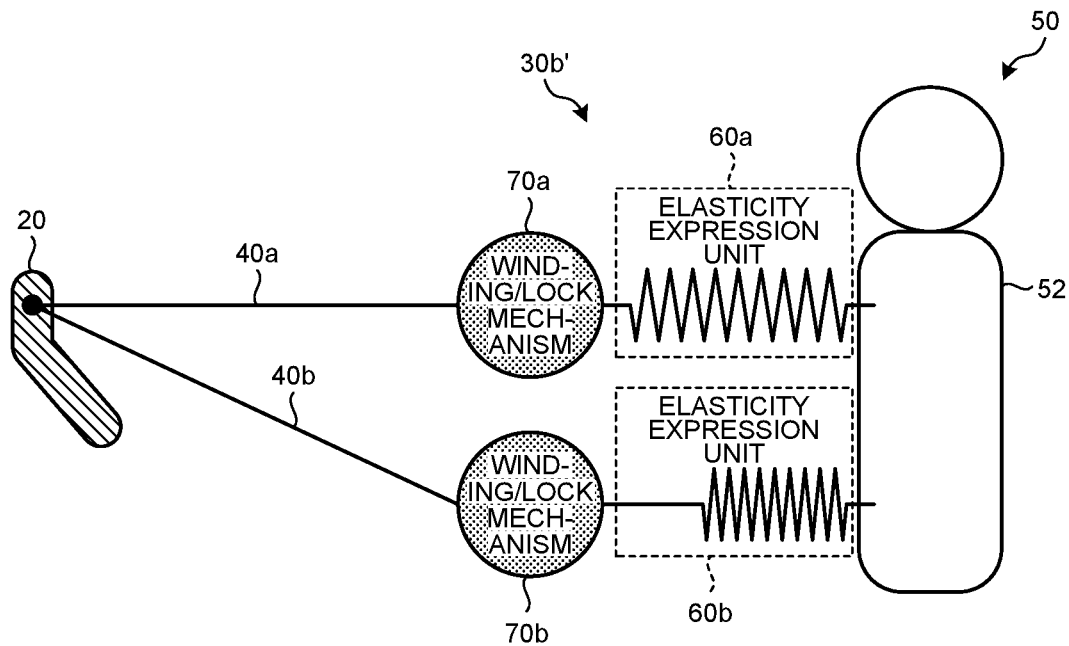
FIG. 18 is a schematic diagram illustrating a configuration of an example of a control system according to a fourth example of the second embodiment.

Next, the fourth example of the second embodiment will be described. The fourth example of the second embodiment is an example using a plurality of patterns of elasticity expressions prepared in advance. FIG. 18 is a schematic diagram illustrating a configuration of an example of a control system according to the fourth example of the second embodiment.

In the example of FIG. 18, a wire control device 30b' includes a first set of a winding/lock mechanism 70a and an elasticity expression unit 60a and a second set of a winding/lock mechanism 70b and an elasticity expression unit 60b. The lock operation for unwinding a wire 40a by the winding/lock mechanism 70a and the lock operation for unwinding a wire 40b by the winding/lock mechanism 70b can be independently controlled.

In each set, the configuration illustrated in FIG. 11A 11B or 15A, 15B (and FIGS. 16A and 16B) in which the elasticity described in the first example or the second example is variable can be applied to the elasticity expression units 60a and 60b. The present invention is not limited thereto, and the configuration illustrated in FIG. 17 in which the elasticity described in the third example is fixed can also be applied to the elasticity expression units 60a and 60b.

In FIG. 18, one end of the wire 40a extended from the first set of the winding/lock mechanism 70 and one end of the wire 40b extended from the second set of the winding/lock mechanism 70 are commonly connected to the controller 20. Here, the second set of the elasticity expression units 60b expresses a harder feel than the first set of the elasticity expression units 60a. For example, in a case where each of the elasticity expression units 60a and 60b has the above-described structure illustrated in FIGS. 15A and 15B, the elasticity expression unit 60a includes the non-contracted coil spring 600, and the elasticity expression unit 60b includes the contracted coil spring 600.

In such a configuration, of the first set and the second set, in a set in which the unwinding of the wire is not locked, the wire is unwound by the amount by which the wire is pulled. On the other hand, in a set in which the unwinding of the wire is locked, the force generated in the elasticity expression unit acts on the pulling of the wire. Therefore, the elasticity is expressed based on the force generated by the elasticity expression unit for which the unwinding of the wire is locked.

As an example, in a case where it is desired to express harder elasticity, the control unit 100 causes the winding/lock mechanism 70b to lock the unwinding of the wire 40b, and the winding/lock mechanism 70a not to lock the unwinding of the wire 40a in. On the other hand, when it is desired to express softer elasticity, the winding/lock mechanism 70a locks the unwinding of the wire 40a, and the winding/lock mechanism 70b does not lock the unwinding of the wire 40b.

In the above description, for the sake of explanation, two sets of the elasticity expression unit 60a and the winding/lock mechanism 70a, and the elasticity expression unit 60b and the winding/lock mechanism 70b are provided as the configuration for expressing the elasticity, but the present invention is not limited to this example, and more sets can be included.

4. Third Embodiment

Next, the third embodiment of the present disclosure will be described. In the third embodiment, in a case where the plurality of wire control devices 30 and the plurality of wires 40 are used, it is possible to control a direction in which the hand 54 virtually comes into contact with or collides with the virtual object 500.

Figure 19A:
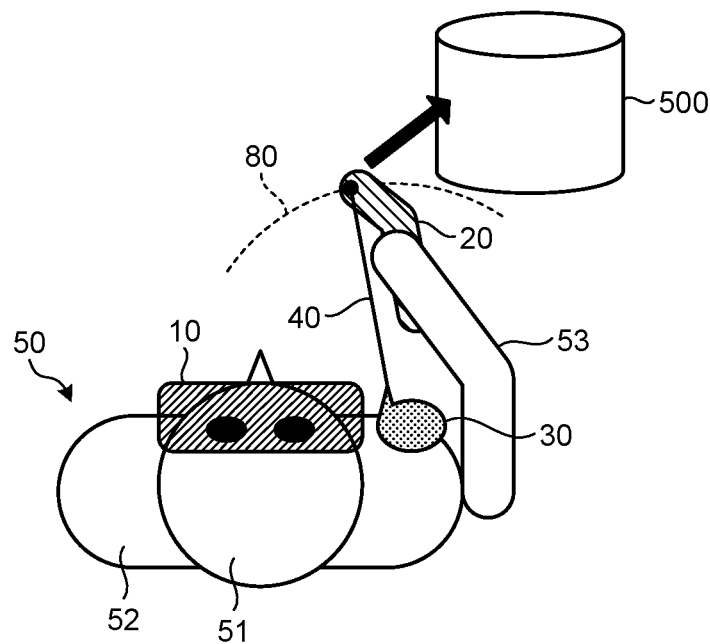
FIG. 19A is a schematic diagram illustrating an example using one wire control device.

A control system according to the third embodiment will be described with reference to FIGS. 19A and 19B. FIG. 19A is a schematic diagram illustrating an example of using one wire control device 30 attached to one side of the body 52 of the user 50. The example of FIG. 19A has a configuration similar to examples of the above-described first embodiment and the second embodiment and each example thereof. In the example of FIG. 19A, a collision with the virtual object 500 is presented by one wire 40.

In this case, even when the wire control device 30 locks the unwinding of the wire 40, the movement of the hand 54 (the controller 20) on a circular orbit 80 around the fixing point of the wire 40 (the wire control device 30 in this example) is not suppressed. Therefore, for example, it is difficult to generate a collision in an oblique direction with respect to the virtual object 500 indicated by an arrow in FIG. 19A.

Figure 19B:
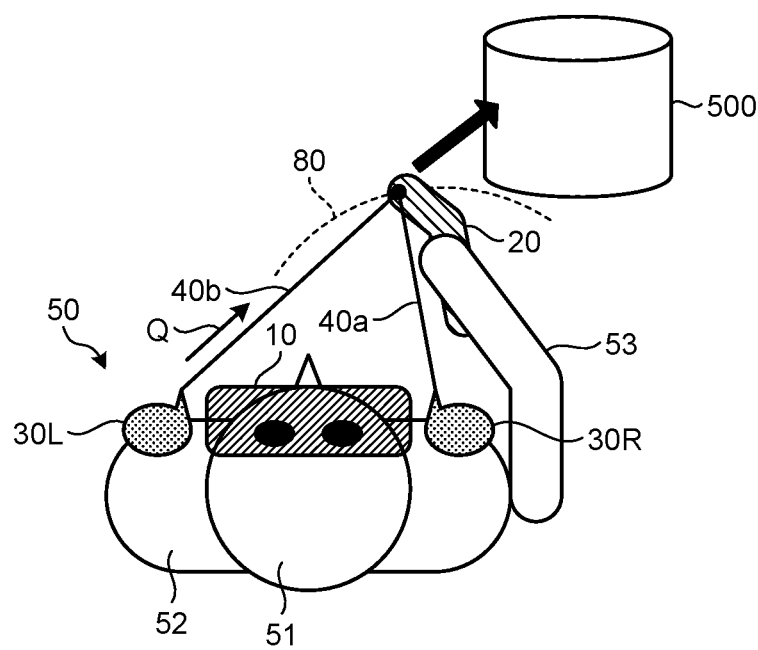
FIG. 19B is a schematic diagram illustrating an example using two wire control devices according to the third embodiment.

FIG. 19B is a schematic diagram illustrating an example using two wire control devices 30L and 30R according to the third embodiment. In FIG. 19B, the wire control device 30R is attached to the right side of the body 52 of the user 50, and the wire control device 30L is attached to the left side. One end of a wire 40*a* drawn out from the wire control device 30R and one end of a wire 40*b* drawn out from the wire control device 30L are commonly connected to the controller 20.

Here, the wire control devices 30R and 30L can be independently controlled. In addition, any of the wire control devices according to the first embodiment and the second embodiment, and each example thereof can be applied to the wire control devices 30R and 30L.

In such a configuration, the control unit 100 designates the unwinding lengths of the wires 40*a* and 40*b* for the wire control devices 30R and 30L, respectively. For example, the wire control device 30R locks the unwinding of the wire 40*a* when the length of the unwound wire 40*a* is a specified length. Similarly, the wire control device 30L locks the unwinding of the wire 40*b* when the length of the unwound wire 40*b* is a specified length. Thus, the position of the controller 20 on the plane including the wire control devices 30*a* and 30*b* and the position of the controller 20 is restricted, and the movement of the controller 20 is suppressed.

By controlling the plurality of wire control devices 30R and 30L in this manner, it is possible to present the user 50 with contact or collision with the virtual object 500 in more directions. As a specific example, in FIG. 19B, it is possible to present a contact with the virtual object 500 in an oblique direction (indicated by an arrow Q) to the user.

In the example of FIG. 19B, two wire control devices 30R and 30L are used, but the present invention is not limited to this example. For example, in addition to the two wire control devices 30R and 30L, a wire control device mounted at a position different in height from the wire control devices 30R and 30L may be used. In this case, for example, the movement of the controller 20 in the vertical direction can be further restricted.

In the third embodiment, for example, the two wire control devices 30R and 30L are preferably attached with a predetermined distance or more. That is, in a case where the two wire control devices 30R and 30L are disposed at close positions, or extremely at the same position, it is difficult to obtain the effect of restricting the movement of the controller 20.

5. Fourth Embodiment

Next, the fourth embodiment of the present disclosure will be described. In the above description, for example, in the configuration including the elasticity expression unit 60 and the winding/lock mechanism 70, the elasticity expression unit 60 and the winding/lock mechanism 70 are disposed on the user 50 (body 52), but the present invention is not limited to this example. That is, at least one of the elasticity expression unit 60 and the winding/lock mechanism 70 can be provided on the controller 20.

Figure 20A:
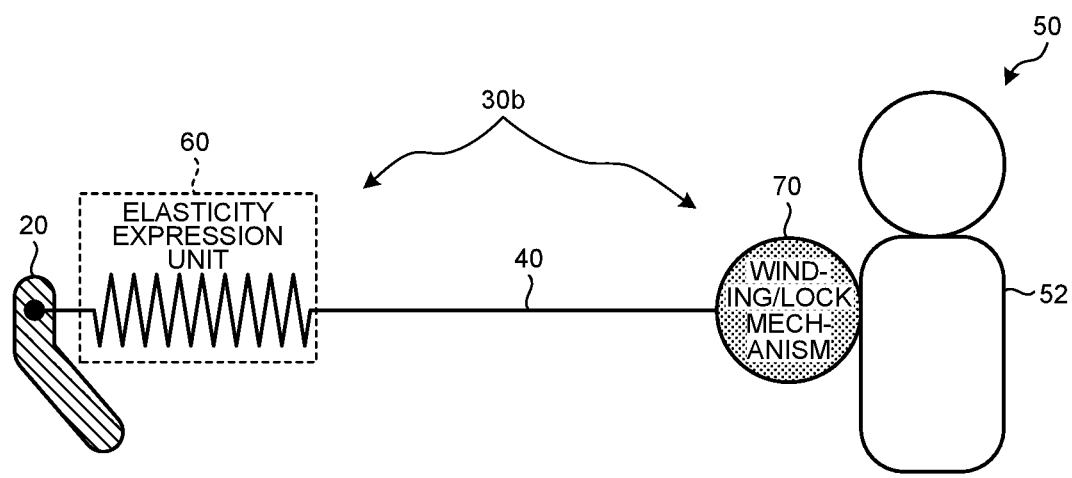
FIG. 20A is a schematic diagram illustrating an example in which an elasticity expression unit is provided on a controller side according to the fourth embodiment.
Figure 20B:
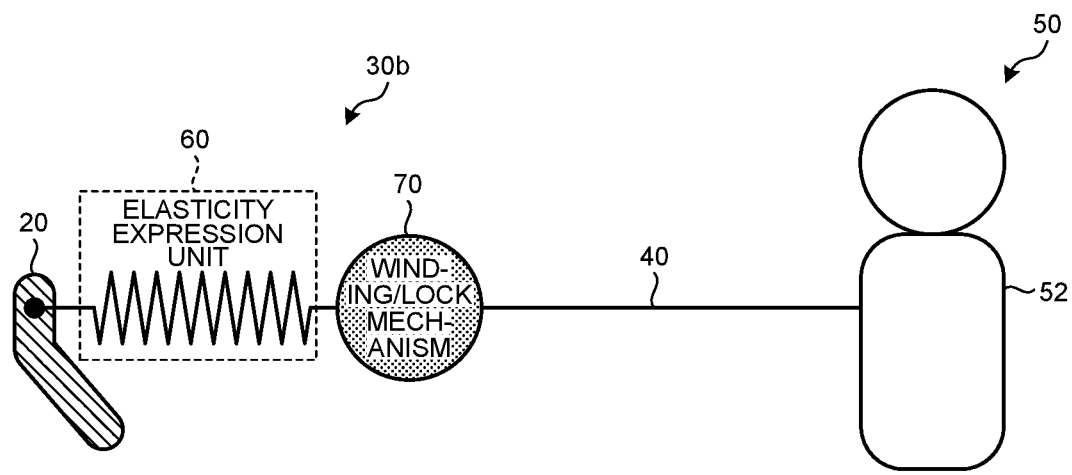
FIG. 20B is a schematic diagram illustrating an example in which an elasticity expression unit is provided on a controller side according to the fourth embodiment.

FIGS. 20A and 20B are schematic diagrams illustrating an example in which the elasticity expression unit 60 is provided on the controller 20 according to the fourth embodiment. FIG. 20A illustrates an example in which the wire control device 30*b* is divided into the elasticity expression unit 60 and the winding/lock mechanism 70, the elasticity expression unit 60 is attached to the controller 20, and the winding/lock mechanism 70 is attached to the body 52 of the user 50. In this case, when the unwinding of the wire 40 from the winding/lock mechanism 70 is locked, the expression of the elasticity by the elasticity expression unit 60 can be exerted.

FIG. 20B has a configuration in contrast to the configuration of FIG. 10 described above, for example, the elasticity expression unit 60 is connected to the controller 20, and the wire 40 unwound from the elasticity expression unit 60 to the user 50 is attached to the body 52 of the user 50 or the like. Even with this configuration, in the same manner as described above, when the unwinding of the wire 40 from the winding/lock mechanism 70 is locked, the expression of the elasticity by the elasticity expression unit 60 can be exerted.

In addition, the configuration according to the fourth embodiment is not limited to the configuration of FIGS. 20A and 20B described above. That is, the winding/lock mechanism 70 may be provided on the controller 20, and the elasticity expression unit 60 may be attached to the body 52.

Which one of these configurations is used can be appropriately selected according to specifications of a product or the like to be applied.

Further, the effects described in the present identification are merely examples and are not limited, and other effects may be present.

The present technology may also be configured as below.

(1) A control device comprising:
a winding unit that unwinds a wire having one end movably held by a user in a direction of the one end and winds the wire by an elastic force in a direction away from the one end;
a wire lock unit that locks unwinding of the wire from the winding unit; and
a control unit that controls an operation by the wire lock unit of locking the unwinding according to a relationship between a position of a virtual object disposed in a virtual space and a position, in the virtual space, corresponding to a position of the one end in a real space.

(2) The control device according to the above (1), further comprising:
an elasticity expression unit that changes a distance from a reference position to the one end of the wire in a state where a tension is applied to the wire in a state where the wire lock unit locks the unwinding.

(3) The control device according to the above (2), wherein the elasticity expression unit
changes the distance in a state where the tension is applied using a motor driven to maintain a rotation angle at a time when the lock is performed.

(4) The control device according to the above (2), wherein the elasticity expression unit
changes the distance in a state where the tension is applied by applying a restoring force in the opposite direction by an elastic body.

(5) The control device according to the above (4), wherein the elastic body is a coil spring.

(6) The control device according to the above (4) or (5), wherein the elasticity expression unit changes the tension by changing a length of the elastic body.

(7) The control device according to any one of the above (4) to (6), wherein the wire includes a plurality of the wires, the winding unit include a plurality of the winding units, the wire lock unit include a plurality of the wire lock units, the elasticity expression unit include a plurality of the elasticity expression units, the winding units being associated with the respective wires, the wire lock units being associated with the respective wires, and the elasticity expression units being associated with the respective wires, the plurality of wires has the respective one ends that are common, and each of the plurality of elasticity expression units changes a distance from a reference position to the one end of the associated wire in a state where different tensions are applied to the respective wires.

(8) The control device according to any one of the above (2) to (7), wherein the wire includes a plurality of the wires, the winding unit include a plurality of the winding units, the wire lock unit include a plurality of the wire lock units, the elasticity expression unit include a plurality of the elasticity expression units, the winding units being associated with the respective wires, the wire lock units being associated with the respective wires, and the elasticity expression units being associated with the respective wires, the plurality of wires has the respective one ends that are common, and the control unit controls an operation by each of the plurality of wire lock units of locking the unwinding according to a relationship between a position of the virtual object in the virtual space and a position, in the virtual space, corresponding to a position of the one end in a real space.

(9) The control device according to any one of the above (1) to (8), wherein the wire is attached to a controller at the one end, the controller being held by a user, the controller transmitting a control signal according to a user operation by the user to the control unit.

(10) The control device according to the above (9), wherein the controller includes a position tracking unit that tracks a position, and in a case where a detection result by the position tracking unit of the position indicates that the one end is located at a position away from a reference position of the wire by a predetermined distance or more, the control unit causes the wire lock unit to lock unwinding of the wire from the winding unit.

(11) The control device according to the above (9) or (10), wherein the control unit causes the wire lock unit to lock unwinding of the wire from the winding unit when detecting a state in which the controller is not held by the user.

(12) The control device according to any one of the above (1) to (11), wherein the wire lock unit releases the lock when a predetermined tension or more is applied in a direction of the one end to the wire in a state in which unwinding from the winding unit is locked.

(13) The control device according to any one of the above (1) to (12), wherein when unwinding of the wire from the winding unit is locked, the control unit causes a head mounted display to be worn on a head of the user, the head mounted display including a display unit that displays the virtual space and a sound output unit that outputs a sound based on a sound signal, to present at least one of a predetermined display on the display unit indicating a state in which the lock is performed and an output of a predetermined sound by the sound output unit.

(14) The control device according to any one of the above (1) to (13), wherein the winding unit and the wire lock unit are attached to a predetermined position around the user.

(15) The control device according to any one of the above (2) to (8), wherein the elasticity expression unit is provided close to the reference position of the wire.

(16) The control device according to any one of the above (2) to (8), wherein the elasticity expression unit is provided close to the one end, and the winding unit and the wire lock unit are provided close to the reference position.

(17) The control device according to any one of the above (2) to (8), wherein the elasticity expression unit, the winding unit, and the wire lock unit are provided close to the one end.

(18) The control device according to any one of the above (1) to (17), wherein the winding unit generates the elastic force by means of a spiral spring.

(19) A control method executed a processor, the method comprising:

a control step of controlling an operation in which a wire lock unit that locks unwinding from a winding unit that unwinds a wire having one end movably held by a user in a direction of the one end and winds the wire in a direction away from the one end locks the unwinding according to a relationship between a position of a virtual object disposed in a virtual space and a position, in the virtual space, corresponding to a position of the one end in a real space.

(20) A control system comprising:

a content generation device including a content generation unit that generates a content represented by a virtual space; and a control device including a winding unit that unwinds a wire having one end movably held by a user in a direction of the one end and winds the wire by an elastic force in a direction away from the one end, a wire lock unit that locks unwinding of the wire from the winding unit, and a control unit that controls an operation by the wire lock unit of locking the unwinding according to a relationship between a position of a virtual object disposed in the virtual space generated by the content generation unit and a position, in the virtual space, corresponding to a position of the one end in a real space.

REFERENCE SIGNS LIST

10 HMD
20 CONTROLLER
21 POSITION TRACKING UNIT
30, 30*a*, 30*b*, 30*b'*, 30L, 30R WIRE CONTROL DEVICE 40, 40a, 40b WIRE
41 WIRE PORTION
50 USER
52 BODY
53 ARM
54 HAND
60, 60a, 60b, 61 ELASTICITY EXPRESSION UNIT
70, 70a, 70b WINDING/LOCK MECHANISM
100 CONTROL UNIT
110 SENSOR UNIT
120 OUTPUT UNIT
300 ROTATION SHAFT
301 LOCK UNIT
303 ROTATION PORTION
304 LOCK PIN
311 STOPPER
320 SPIRAL SPRING
340, 601 MOTOR
341 FIXED SHAFT
500, 500a, 500b, 500c, 500d VIRTUAL OBJECT
501 SOLID PORTION
502 ELASTIC PORTION
600 COIL SPRING
1001 APPLICATION EXECUTION UNIT
2004 VIBRATOR
3001 WINDING UNIT
3002 LOCK MECHANISM

The invention claimed is:

1. A control device, comprising:
a winding unit configured to:
unwind a wire having one end movably held by a user in a direction of the one end, and
wind the wire by an elastic force in a direction away from the one end;
a wire lock unit configured to lock unwinding of the wire from the winding unit; and
a control unit configured to control an operation by the wire lock unit of locking the unwinding based on a relationship between a position of a virtual object in a virtual space and a position, in the virtual space, corresponding to a position of the one end in a real space.

2. The control device according to claim 1, further comprising:
an elasticity expression unit configured to change a distance from a reference position to the one end of the wire in a state where a tension is applied to the wire in a state where the wire lock unit locks the unwinding.

3. The control device according to claim 2, wherein the elasticity expression unit is further configured to change the distance in a state where the tension is applied using a motor driven to maintain a rotation angle at a time when the lock is performed.

4. The control device according to claim 2, wherein
the elasticity expression unit is further configured to change the distance in a state where the tension is applied by applying a restoring force in the opposite direction by an elastic body.

5. The control Device according to claim 4, wherein the elastic body is a coil spring.

6. The control device according to claim 4, wherein
the elasticity expression unit is further configured to change the tension by changing a length of the elastic body.

7. The control device according to claim 2, wherein
the wire includes a plurality of wires, the winding unit include a plurality of the winding units, the wire lock unit include a plurality of the wire lock units, the elasticity expression unit include a plurality of the elasticity expression units, the winding units is associated with the respective wires, the wire lock units is associated with the respective wires, and the elasticity expression units is associated with the respective wires,
the plurality of wires has the respective one ends that are common, and
each of the plurality of elasticity expression units is configured to change a distance from a reference position to the one end of the associated wire in a state where different tensions are applied to the respective wires.

8. The control device according to claim 2, wherein
the wire includes a plurality of wires, the winding unit include a plurality of the winding units, the wire lock unit include a plurality of the wire lock units, the elasticity expression unit include a plurality of the elasticity expression units, the winding units is associated with the respective wires, the wire lock units is associated with the respective wires, and the elasticity expression units is associated with the respective wires,
the plurality of wires has the respective one ends that are common, and
the control unit is further configured to control an operation by each of the plurality of wire lock units of locking the unwinding according to a relationship between a position of the virtual object in the virtual space and a position, in the virtual space, corresponding to a position of the one end in a real space.

9. The control device according to claim 1, wherein
the wire lock unit is further configured to release the lock when a specific tension or more is applied in a direction of the one end to the wire in a state in which unwinding from the winding unit is locked.

10. The control device according to claim 1, wherein
when unwinding of the wire from the winding unit is locked,
the control unit is further configured to cause a head mounted display to be worn on a head of the user, the head mounted display including a display unit configured to display the virtual space and a sound output unit configured to output a sound based on a sound signal, to present at least one of a predetermined specific display on the display unit indicating a state in which the lock is performed and an output of a specific sound by the sound output unit.

11. The control device according to claim 1, wherein
the winding unit and the wire lock unit are attachable to a specific position around the user.

12. The control device according to claim 2, wherein
the elasticity expression unit is close to the reference position of the wire.

13. The control device according to claim 2, wherein
the elasticity expression unit is close to the one end, and the winding unit and the wire lock unit are close to the reference position.

14. The control device according to claim 2, wherein
the elasticity expression unit, the winding unit, and the wire lock unit are close to the one end.

15. The control device according to claim 1, wherein
the wire is attachable to a controller at the one end, the controller is held by a user, the controller is further configured to transmit a control signal based on a user operation by the user to the control unit.

16. The control device according to claim 15, wherein
the controller includes a position tracking unit configured to track a position, and
in a case where a detection result by the position tracking unit of the position indicates that the one end is located at a position away from a reference position of the wire by a specific distance or more, the control unit is further configured to cause the wire lock unit to lock unwinding of the wire from the winding unit.

17. The control device according to claim 15, wherein
the control unit is further configured to cause the wire lock unit to lock unwinding of the wire from the winding unit when detecting a state in which the controller is not held by the user.

18. The control device according to claim 1, wherein
the winding unit is further configured to generate the elastic force by means of a spiral spring.

19. A control method executed a processor, the method comprising:
controlling an operation in which a wire lock unit that locks unwinding from a winding unit that unwinds a wire having one end movably held by a user in a direction of the one end and winds the wire in a direction away from the one end locks the unwinding based on a relationship between a position of a virtual object in a virtual space and a position, in the virtual space, corresponding to a position of the one end in a real space.

20. A control system, comprising:
a content generation device including a content generation unit configured to generate a content represented by a virtual space; and
a control device including:
  a winding unit configured to:
    unwind a wire having one end movably held by a user in a direction of the one end, and
    wind the wire by an elastic force in a direction away from the one end,
  a wire lock unit configured to lock unwinding of the wire from the winding unit, and
  a control unit configured to control an operation by the wire lock unit of locking the unwinding based on a relationship between a position of a virtual object in the virtual space generated by the content generation unit and a position, in the virtual space, corresponding to a position of the one end in a real space.

* * * * *